US012755349B1

(12) United States Patent
Yeung et al.

(10) Patent No.: US 12,755,349 B1
(45) Date of Patent: Oct. 6, 2026

(54) GRAPHICALLY ALTERING DIGITAL MEDIA BY EMBEDDING VIRTUAL OBJECTS USING ARTIFICIAL INTELLIGENCE

(71) Applicant: Wear It AI, Inc., Wilmington, DE (US)

(72) Inventors: Yan Mui Kitty Yeung, Alameda, CA (US); Desheng Cui, Jinzhong City (CN)

(73) Assignee: Wear It AI, Inc., Wilmington, DE (US)

( * ) Notice: Subject to any disclaimer, the term of this patent is extended or adjusted under 35 U.S.C. 154(b) by 0 days.

(21) Appl. No.: 19/658,369

(22) Filed: Apr. 24, 2026

Related U.S. Application Data

(60) Provisional application No. 63/795,007, filed on Apr. 25, 2025.

(51) Int. Cl.

| | |
|---|---|
| ***G06T 5/60*** | (2024.01) |
| ***G06N 3/0455*** | (2023.01) |
| ***G06T 5/70*** | (2024.01) |

(52) U.S. Cl.
CPC ............ *G06T 5/60* (2024.01); *G06N 3/0455* (2023.01); *G06T 5/70* (2024.01); *G06T 2200/24* (2013.01);
(Continued)

(58) Field of Classification Search
CPC ....... G06T 2210/16; G06T 2207/30196; G06T 11/00
See application file for complete search history.

(56) References Cited

U.S. PATENT DOCUMENTS

| | | | | |
|---|---|---|---|---|
| 12,439,986 B2 * | 10/2025 | Yeung | ................... | A41H 3/007 |
| 12,505,629 B1 * | 12/2025 | Vorobiov | .................. | G06T 7/50 |

(Continued)

FOREIGN PATENT DOCUMENTS

| | | | | |
|---|---|---|---|---|
| CN | 118447110 A * | 8/2024 | ............. | G06T 11/10 |
| CN | 120032021 A * | 5/2025 | ........... | G06N 3/0455 |

(Continued)

*Primary Examiner* — Gandhi Thirugnanam
(74) *Attorney, Agent, or Firm* — Ashurst Perkins Coie US LLP

(57) ABSTRACT

The systems and methods disclosed herein dynamically generate, in real-time or near real-time, media (e.g., images, video) integrating user-generated content with embedded product information using universal (i.e., non-user specific) model(s). Products (e.g., clothes) embedded in retailer content (e.g., on a person on a product webpage) can be displayed on a user (e.g., a virtual try-on) in the visual style designed by the product maker (e.g. brand's photography background and scene). The system can generate a prompt by extracting an image description using an image-to-text artificial intelligence model and combining it with a user's description. Using the prompt, the system can generate the combined image and apply a series of fine-tuning models. To realistically depict a user's shape, the system can redraw the user's outline and map the combined image to the outline. To realistically depict a user's face shape/complexion, the system can adjust the combined image in accordance with the user's outline (i.e., adjusting for face shape) and input image (i.e., adjusting for complexion).

20 Claims, 22 Drawing Sheets

(52) U.S. Cl.
CPC ............... *G06T 2207/20084* (2013.01); *G06T 2207/30196* (2013.01)

(56) References Cited

U.S. PATENT DOCUMENTS

| | | | | |
|---|---|---|---|---|
| 2021/0241497 | A1* | 8/2021 | Agrawal | G06N 3/0475 |
| 2021/0272341 | A1* | 9/2021 | Swaminathan | G06T 7/11 |
| 2023/0354941 | A1* | 11/2023 | Yeung | A41H 3/007 |

FOREIGN PATENT DOCUMENTS

| | | | | |
|---|---|---|---|---|
| WO | WO-2025101496 A1 | * | 5/2025 | G06T 11/00 |
| WO | WO-2025264942 A1 | * | 12/2025 | G06T 7/70 |

* cited by examiner

FIG. 7
Generated Image 707
Mask 704
User Image 702

700

1000

Resized Image 1004

Input Image 1002

*FIG. 11*
1100
Processed Image 1104
Input Image 1102

Pre-Tuned Image 1602

Tuned Image 1604

GRAPHICALLY ALTERING DIGITAL MEDIA BY EMBEDDING VIRTUAL OBJECTS USING ARTIFICIAL INTELLIGENCE

CROSS-REFERENCE TO RELATED APPLICATION(S)

The present application claims the benefit of U.S. Provisional Patent Application No. 63/795,007 entitled "REAL-TIME CONTENT GENERATION WITH EMBEDDED OBJECTS FOR VIRTUAL AUGMENTATION OF DIGITAL MEDIA USING ARTIFICIAL INTELLIGENCE" and filed Apr. 25, 2025. The present application further claims the benefit of International Patent Application No. PCT/IB25/54354 entitled "REAL-TIME CONTENT GENERATION WITH EMBEDDED OBJECTS FOR VIRTUAL AUGMENTATION OF DIGITAL MEDIA USING ARTIFICIAL INTELLIGENCE" and filed Apr. 26, 2025. The content of the foregoing applications is incorporated herein by reference in their entirety.

BACKGROUND

Augmented reality applications have been developed in which virtual objects are digitally overlaid on images of real-world objects. In some cases, virtual objects such as gaming characters are added to images of a scene displayed by a smartphone or tablet as a user navigates the scene. In other cases, cartoon features such as cartoon animal facial features are added to an image of a face of a user of a smartphone or tablet, the image having been captured by the camera of the smartphone or tablet. In these conventional augmented reality systems, the cartoonish, or unrealistic, nature of the virtual objects allows significant leeway in the accuracy of the size, shape, orientation, and placement of the virtual objects relative to the real-world objects.

While these applications provide entertainment value, they often fall short in addressing practical consumer needs, particularly in the realm of online shopping and product visualization (e.g., virtual try-on systems). For example, a consumer may want to know what they will look like in and/or with a product. On the webpage of a certain product, a photograph of a person in and/or with the particular product may be shown. However, users may want to see more accurate depictions of themselves in relation to various products. Current augmented reality systems face significant implementation challenges when attempting to create realistic virtual try-on (e.g., augmented) experiences. Unlike cartoonish overlays or simple filters, which allow for considerable imprecision, realistic product visualization demands a high degree of accuracy in size, shape, orientation, photography style and placement of virtual objects relative to real-world elements. Moreover, realistic product visualization typically not only requires photorealistic rendering styles but also an accurate representation of the user's unique body shape, facial features, and hair, while simultaneously ensuring that product details remain unaltered to meet brand expectations and maintain authenticity.

Figure 1:
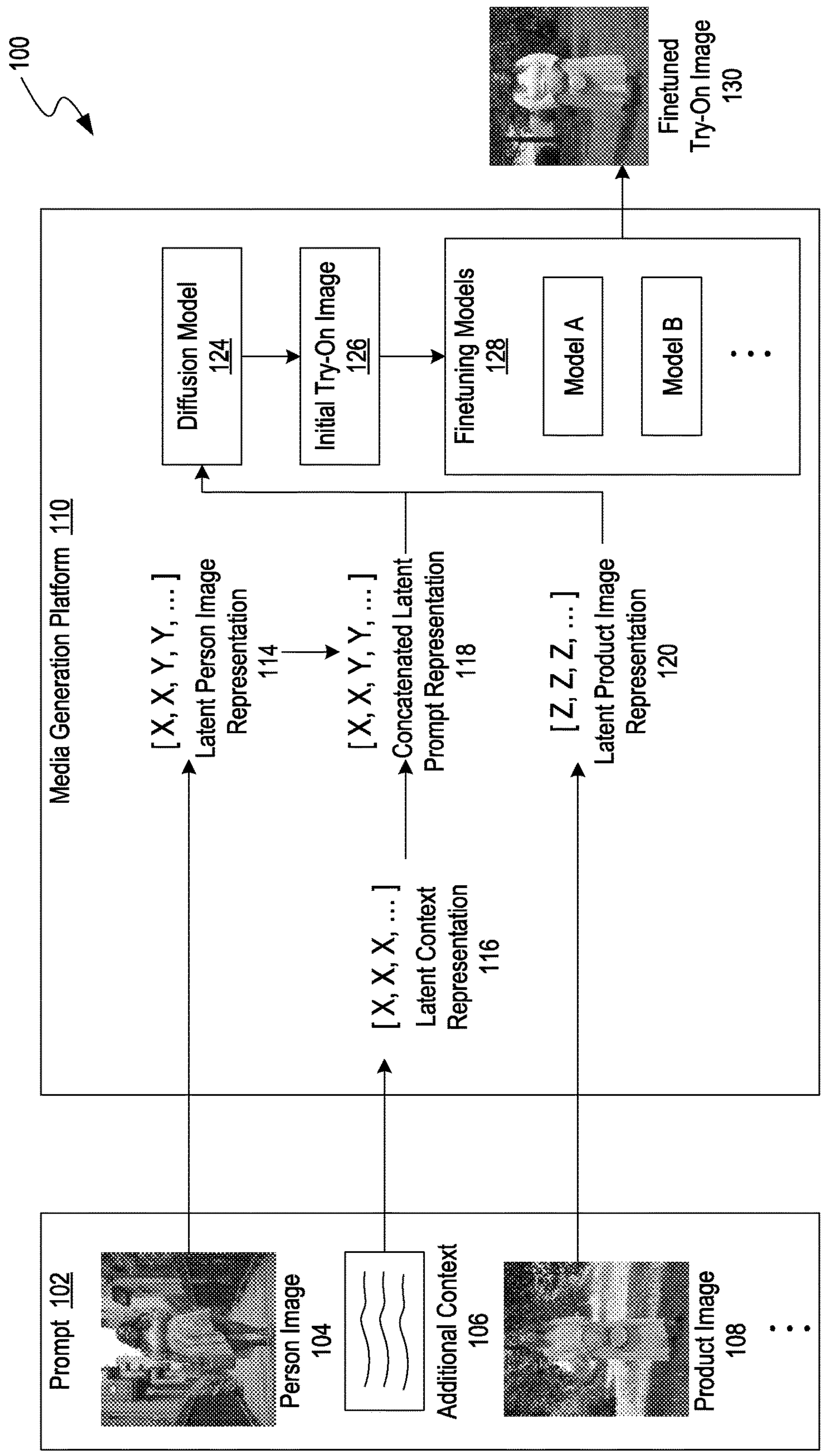
FIG. 1 illustrates an example environment of a media generation platform for dynamically generating customized try-on digital media representing embedded product information using artificial intelligence (AI) models.

The drawings have not necessarily been drawn to scale. For example, some components and/or operations are separated into different blocks or combined into a single block for the purposes of discussion of some of the implementations of the disclosed system. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

In the context of virtual try-on (e.g., augmentation), conventional augmented reality systems typically operate by superimposing digital representations of products onto a live or static image (or video) of the user. Conventional augmented reality systems typically obtain (e.g., receive, capture) an image or video of the user (e.g., through a device's camera, uploaded from a device). The input can be used to detect key features such as facial landmarks, body contours, or specific body parts relevant to the product being tried on. For clothing, conventional augmented reality systems can identify the user's shoulders, torso, and limbs, while for eyewear, conventional augmented reality systems can identify facial features and head orientation. Once these reference points are established, conventional augmented reality systems typically retrieve a three-dimensional model or a two-dimensional image of the product to be virtually tried on. The digital product representation is then transformed and scaled to match the user's proportions and position.

By relying on a pre-set three-dimensional model or two-dimensional image for product overlay, the flexibility and adaptability of conventional augmented reality systems are significantly limited. For example, individually modeling each product in three dimensions is a time-consuming and resource-intensive process that becomes increasingly challenging as product catalogs expand. The reliance on static three-dimensional models or two-dimensional image restricts the system's ability to quickly adapt to new or custom products, seasonal variations, or last-minute design changes. Furthermore, conventional augmented reality systems often struggle to realistically render how different materials interact with light, shadow, and the user's body. This can result in a disconnected visual experience where virtual products appear to float unnaturally on top of the user's image. The lack of dynamic adjustment capabilities in conventional augmented reality systems means they often fail to account for the nuances of different body types, poses, and lighting conditions, leading to representations that may be misleading or unrealistic for many users.

Moreover, conventional augmented reality systems struggle to adapt virtual clothing to diverse user body types. Conventional augmented reality systems often use a one-size-fits-all approach, where the virtual garment maintains the dimensions and proportions of the original person regardless of the user's actual body shape. For instance, if the conventional augmented reality system's base person (e.g. brand's fashion model) is thin, the virtual clothing appears thin even when applied to users with different body types. The inability to accurately adjust for factors such as body curvature, height differences, or varying proportions means that users may see garments that appear unnaturally stretched, compressed, or misaligned with their actual physique. Recent generative AI approaches have attempted to keep the product images unaltered using in-painting and out-painting methods to redraw or modify body areas. While these methods improve the degree of realism of lighting and appearance, conventional methods still struggle with accurately representing individual users' unique physical characteristics. For example, the challenge persists in capturing the wide variety of human body shapes, skin tones, and facial features. In addition to limited body types, conventional augmented reality systems typically offer limited or no capability to change the pose of the virtual try-on person. Users are often restricted to viewing the product from a single, predetermined stance, which may not reflect how they would naturally position themselves or how the product would appear in various real-world scenarios. This rigidity in posing significantly constrains the user's ability to fully evaluate the product's appearance and fit under different conditions. For example, for clothing items, users cannot see how fabrics might drape or move with different body positions. In another example, for accessories, the fixed pose may not allow users to assess how items look from various angles or in different styling contexts.

Further, conventional augmented reality systems typically use user-specific model training for calibration, a process that can be time-consuming and resource-intensive (e.g., GPU resources). The heavy computational requirements of the calibration limit its accessibility, as it may not be feasible on many consumer-grade devices or in areas with limited internet connectivity, or simply not meet consumer expectation of attention span. Individual user calibration makes conventional augmented reality systems challenging to scale, particularly for smaller retailers or businesses with limited technological infrastructure. Thus, some conventional augmented reality systems use generic user models (e.g., stock user models) rather than personalized representations, limiting their accuracy and relevance for individual users. These systems often rely on a limited set of standardized body types or facial features and neglect to account for the wide diversity in human appearances. Users may misinterpret virtual representations, as the representations fail to accurately reflect individual variations in body shape, skin tone, hair texture, or facial features. Some conventional augmented reality systems require users to upload multiple images of themselves, including both face and body shots, to train an AI model. However, not only is the training process time-consuming (e.g., 30 minutes or more), the generated media may still lack realism. For example, the person depicted often looks noticeably different from the actual user, and product details may be subtly altered, thus reducing the accuracy of the virtual try-on experience.

As such, the inventors have developed systems and methods for dynamically generating customized try-on digital media representing embedded product information using AI models and as few as a single user photo (hereinafter the "media generation platform"). The media generation platform can dynamically generate, in real-time or near real-time, media (e.g., images, video) that integrates user-generated content with embedded product information using universal (i.e., non-user-specific) model(s). Products (e.g., clothes) embedded in retailer content (e.g., on a person on a product webpage) can be displayed on a user (e.g., a virtual try-on). The media generation platform can generate a prompt for one or more AI models by extracting an image description of the user and/or product using an image-to-text AI model (e.g., Contrastive Language-Image Pre-training, Text-To-Text Transfer Transformer models) and combining it with a user's description, the original image of the person, and/or the original image of the product. One or more portions of the prompt can be mapped into a high-dimensional vector space, resulting in both a person vector representation and a product vector representation.

Using the prompt, the media generation platform can use a latent diffusion model to generate an initial try-on image by generating a noisy image representation and then iteratively denoising it according to the guidance provided by the prompt. The initial try-on image can be subsequently modified using a series of fine-tuning models. For example, to realistically depict a user's shape, the media generation platform can redraw the user's outline and map the combined image to the outline. In another example, to realistically depict a user's face shape/complexion, the media generation platform can adjust the combined image in accordance with the user's outline (i.e., adjusting for face shape) and input image (i.e., adjusting for complexion). To provide photorealism, the background and overall style is also generated according to the product image.

In some implementations, the media generation platform can be used to implement live, interactive, or near-real-time virtual try-on in which a try-on output is generated and updated in response to user movement, frame sequences, product changes, user commands, and/or other environmental changes. For video or near-live/live operation, the media generation platform can use a video editing model that receives as input one or more source video frames, source video latents, free-text edit instructions, and/or reference images or embeddings describing a target garment, accessory, and/or scene style. The video editing model can be trained to generate edited video latents or frames that preserve source motion and composition while changing semantic content specified by the instruction. For example, the video editing model can use a variational autoencoder to compress each incoming frame (or select frames) into a latent representation, apply edits to the latent representation based on the conditioning signals (e.g., text instructions, reference images), and then decode the edited latent representation back into a displayable frame.

To achieve reduced latency, the media generation platform can process a near-live or live video stream by editing only selected keyframes and propagating those edits to neighboring frames. In this architecture, a first, e.g., larger editing model can be executed on selected keyframes (e.g., one frame out of every X frames). The intermediate frames can be generated or updated by propagating edited content from the keyframe to neighboring frames. For example, the media generation platform can estimate how the user moves between frames using motion tracking (e.g., optical flow, feature tracking, correspondence maps) to determine the displacement of pixels from one frame to the next. Based on the estimated motion, the media generation platform can warp the edited keyframe by shifting pixels according to the motion vectors to generate the intermediate frames, such that the edited garment or product follows the user's body movement and is thus perceived as natural.

By not using pre-set three-dimensional models or training on multiple user images, the media generation platform is enabled to quickly accommodate new products, custom designs, and seasonal variations without the time-consuming process of creating individual three-dimensional models or AI models trained on users. Further, unlike conventional systems that struggle to adapt to diverse body types and fixed poses, the media generation platform is able to dynamically modify try-on images using fine-tuning models that account for the nuances of different body shapes, sizes, and/or poses. For example, by using Canny edge detection to create outlines of the user's body, the media generation platform can ensure that virtual clothing adapts accurately to individual physiques. Furthermore, modifying poses enables users to view products from multiple angles and in various scenarios to provide a more comprehensive and realistic evaluation of how items look and fit in real-world situations and create content they can further use for social commerce.

Further, since the media generation platform uses universal, non-user-specific models, the media generation platform reduces the need for time-consuming and resource-intensive individual calibrations. Thus, the augmented reality system is accessible on a wide range of devices and in various network conditions (e.g., devices with constrained GPU availability or limited network bandwidth). At the same time, the media generation platform maintains a high degree of personalization by using AI models to automatically/dynamically adjust for individual variations in body shape, skin tone, facial features, and/or hair styles and texture.

While the current description provides examples of the AI models related to generative AI models, such as diffusion models and transformer models, one of skill in the art would understand that the disclosed techniques can apply to other forms of machine learning (ML) or algorithms, including unsupervised, semi-supervised, supervised, and reinforcement learning techniques. For example, the disclosed media generation platform can use AI model outputs from support vector machine (SVM), k-nearest neighbor (KNN), decision-making, linear regression, random forest, naïve Bayes, or logistic regression algorithms and/or other suitable computational models.

In some implementations, the media generation platform can use different models for specific tasks. For example, the media generation platform can use Language-Vision Assistant (LLava) to generate image captions/descriptions (of the user/person and/or the product/garment). LLava (or similar types of models) can be used to generate textual descriptions of given images and/or specific elements of the image, such as background, clothing, objects, and so forth. In another example, the media generation platform can use Background Image Removal AI (BIRA) to extract human foregrounds from images (e.g., user/person/subject images) by removing backgrounds. Additionally, the media generation platform can use Multi-Modal Fashion Parser (M2FP) to perform a semantic segmentation of human body parts (e.g., hair, face, clothes, arms, legs) of the image (e.g., the user/person/subject image), which can be used in the subsequent mask generation for region-specific editing. Further, the media generation platform can use a faceswap model to replace faces in target images with the user's face while preserving facial structure, lighting, expression consistency, and so forth.

In some implementations, the media generation platform 110 includes an orchestration engine that coordinates a plurality of AI models or modules. The orchestration engine may determine which model or models to execute, the order of execution, conditions for fallback, retry, or refinement, and how outputs from multiple models are combined. The orchestration engine can run on one or more servers, user devices, edge devices, or combinations thereof.

In some implementations, the output try-on image or video is used in one or more downstream workflows, such as e-commerce product preview, user-generated content creation, personalized style recommendation, advertisement generation, or other media generation. The media generation platform 110 may be integrated with a product catalog, transaction system, shopping cart, recommendation system, retail interface, social publishing system, or other downstream applications.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Example Implementations of the Media Generation Platform

FIG. 1 illustrates an example environment 100 of a media generation platform 110 for dynamically generating customized try-on digital media representing embedded product information using artificial intelligence (AI) models. Implementations of the example environment 100 can include different and/or additional components or can be connected in different ways. The example environment 100 includes a prompt 102 (that can include a person image 104, additional context 106, product image 108, and so forth) that is input into the media generation platform 110. The prompt 102 refers to the input to the media generation platform 110 that guides (i.e., serves as a conditioning signal) the AI system in generating the desired output. For example, a prompt 102 can include a full-body photograph of a person (person image 104), textual descriptions of desired clothing style and fit (additional context 106), and a product catalog image of a garment (product image 108).

In some implementations, one or more models (e.g., a BRIA model) are used to extract the foreground from the person image 104 and/or the product image 108. The product image 108 can be pre-processed by the media generation platform 110 before extracting the foreground. For example, the models of FIGS. 2, 3, and/or 5 can be used to generate the pre-processed product image. By identifying structural information such as edge maps or depth information, the models can selectively adjust shadows or modify background elements to cause the product to stand out more prominently. The pre-processed product image refers to the product image with adjusted lighting, contrast, exposure, and so forth to increase the clarity of the product within the product image 108.

The media generation platform 110 can generate, from the person image 104, a latent person image representation 114 using a redux image encoder. The latent person image representation 114 refers to a characterization of the visual content in the person image 104, and can be generated using a vision-language model such as a redux image encoder to convert the person image 104 into embeddings that capture attributes including pose, body shape, facial features, and/or existing clothing. For example, the redux image encoder can pass the input image through multiple convolutional layers, each extracting increasingly abstract features. The features can include granular features such as edges and textures in early layers, and subsequently progress to broader features such as object shapes and scene composition in deeper layers. The output of the redux image encoder is the latent person image representation 114-*a* high-dimensional vector or tensor that encapsulates the extracted features of the input image.

In some implementations, the media generation platform 110 can perform feature extraction using models such as a LLaVA model (or a caption model) to identify visual elements of the person image 104 and convert these features into text descriptions. For example, the media generation platform can prompt the LLaVA model with an instruction such as "describe the image background" and receive, from the LLaVA model, a description of the image background. In some implementations, the media generation platform 110 is provided a preloaded query context of a word/data limit (e.g., limited to 600-100 words).

The media generation platform 110 can further generate a latent context representation 116 and a latent product image representation 122 from the additional context 106 and product image 108, respectively. The latent context representation 116 can be generated using a Contrastive Language-Image Pre-training (CLIP) text encoder. For example, CLIP uses a dual-encoder architecture that aligns image and text representations in a shared embedding space, enabling CLIP to generate textual descriptions for given images. The latent context representation 116 is a high-dimensional vector (e.g., 868 or 1124 dimensions) that encodes the visual characteristics of the additional context 106 in a mathematical form (i.e., a vector representation) by passing the additional context 106 through encoder networks that compress the visual information into a dense representation in the model's latent space.

The latent person representation 114 (generated by the redux image encoder) can be concatenated with the latent context representation 116 (generated by the CLIP text encoder) to generate a concatenated latent prompt representation 118. The latent context representation 116 is a vector encoding of the additional context 106 generated by passing textual information through transformer-based language models that convert natural language descriptions into mathematical representations (i.e., a vector representations) that capture semantic meaning and stylistic preferences. For example, the media generation platform 110 can tokenize the text input, pass these tokens through embedding layers of an embedding model, and then pass the outputs of the embedding layers through multiple transformer blocks that produce context-aware embeddings with attention mechanisms to identify particular contextual elements.

The latent product image representation 122 can be a compressed encoding of the product image 108 and can be generated using similar encoder networks as used for the person image 104. In some implementations, the encoder networks used for the latent product image representation 122 are modified to capture product-specific details such as fabric texture, color patterns, and/or structural elements of a product (e.g., a garment). In some implementations, the media generation platform can use a LLaVA model to generate a description of the background of the product image 108. The background description can be used to extract the foreground of the product image 108 (e.g., using a BRIA model).

The latent product image representation 122 and the concatenated latent prompt representation 118 can be used by a diffusion model 124 to generate an initial try-on image (or any digital media) 126. The diffusion model 124 refers to a generative AI model (e.g., GenAI, GAN, Gen AI) that progressively transforms random noise into coherent images by iteratively denoising the input according to the guidance provided by the latent representations. The diffusion model 124 operates through a series of denoising steps (e.g., 50-100 iterations) where, at each step, the diffusion model 124 predicts and removes a particular amount of noise while being conditioned on the latent representations to ensure the generated image contains the desired content and style elements.

In some implementations, the diffusion model 124 has a diffusion-transformer architecture that uses a Mixture of Experts design. The Mixture of Experts design can include a first expert network and a second expert network (e.g., a model such as a neural network or other AI model) that are selectively activated based on a noise level of the latent representation during the iterative denoising process. The first expert network can be structured to process the latent representation during an early denoising stage when the noise level exceeds a threshold. The second expert network can be structured to process the latent representation during a later denoising stage when the noise level is below the threshold.

In some implementations, the foreground of the person image 104 replaces the foreground of the product image 108. The media production platform can, using one or more AI models (e.g., GANs or diffusion models), redraw the foreground region in the replaced image in areas that were not a part of the copied user foreground. One or more AI models (e.g., an M2FP model) can be used to generate a mask for clothing, hands, and legs in a redrawn image. For example, the M2FP model can use a multi-class pixel-wise classification to assign each pixel to categories such as "upper body clothing," "lower body clothing," "left hand," "right hand," "left leg," and "right leg," and so forth. In some implementations, the mask is dilated to ensure that the head region is excluded at the same time.

One or more AI models (e.g., a BRIA model) can be used to extract the foreground of the original product image (e.g., the product image before pre-processing). The media generation platform can use one or more AI models to generate a second redrawn image by redrawing the masked region in the redrawn image using the foreground of the original product image (before pre-processing) as a conditioning signal. Thus, this conditioning ensures that the redrawn areas accurately reflect the product's texture, color, and style while conforming to the user's body shape and pose. One or more AI models (e.g., a faceswap model) can be used to transfer the user's face (from the original person image 104) onto the second redrawn image, thus generating the initial try-on image 126.

One or more fine-tuning models 128 can be applied on the initial try-on image 126 to generate a fine-tuned try-on image 130. The fine-tuning models 128 are neural networks trained to modify specific aspects of the initial try-on image, such as improving facial details, refining clothing fit, adjusting lighting consistency, increasing texture realism, and so forth. The fine-tuning models 128 can each be trained on data labeled with a particular aspect of the image quality and can apply convolutional layers with residual connections to modify pixel values while preserving the overall structure and composition of the image. The diffusion model 124 and fine-tuning models 128 are the same as or similar to AI system 2000, illustrated and described in more detail with reference to FIG. 20. The diffusion model 124 and fine-tuning models 128 can be implemented using components of example computer system 2100 illustrated and described in more detail with reference to FIG. 21.

Figure 2:
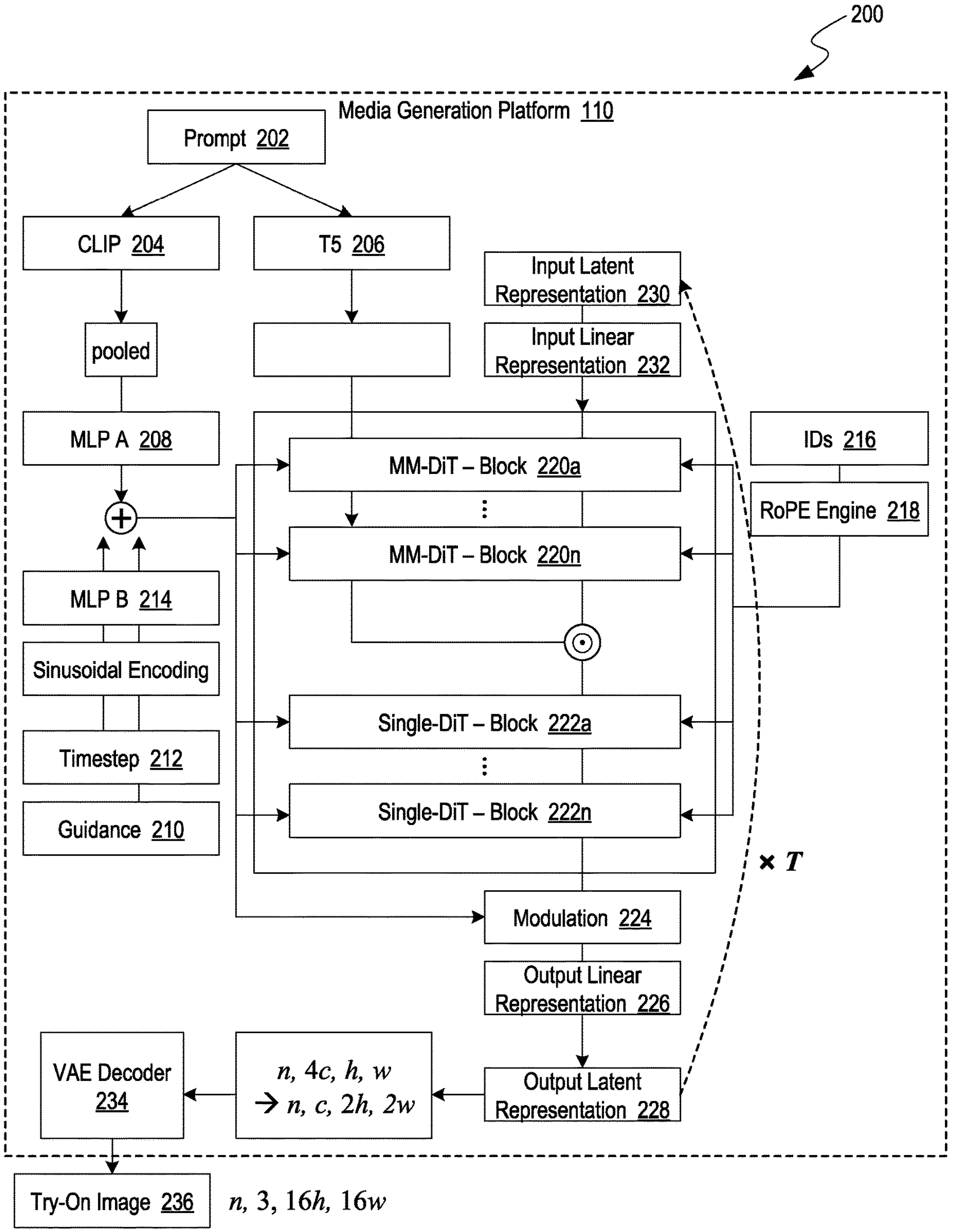
FIG. 2 illustrates an example environment of a text-to-image model of a media generation platform for generating an image from a natural language prompt, in accordance with some implementations of the technology.

FIG. 2 illustrates an example environment 200 of a text-to-image model of the media generation platform 110 for generating an image from a natural language prompt, in accordance with some implementations of the technology. The example environment 200 includes a prompt 202, a first text encoder 204 (e.g., CLIP text encoder), a second text encoder 206 (e.g., a or Text-To-Text Transfer Transformer (T5) text encoder), a first multilayer perceptron (MLP) 208, guidance 210, timestep 212, a second MLP 214, position identifiers 216, rotary position embedding (RoPE) engine, multimodal diffusion transformer blocks 220 (e.g., **220*a* through 220*n*), single instance diffusion transformer blocks 222 (e.g., 222*a* through 222*n*), modulation engine 224, linear transformation 226, output latent representation 228, input latent representation 230, variational autoencoder (VAE) 234, and try-on image 236**.

The models within the environment 200, such as first text encoder 204, second text encoder 206 (e.g., a T5 text encoder), first MLP 208, second MLP 214, ROPE engine, multimodal diffusion transformer blocks 220, single instance diffusion transformer blocks 222, and VAE 234, are the same as or similar to AI system 2000, illustrated and described in more detail with reference to FIG. 20. The models within the environment 200 can be implemented using components of example computer system 2100 illustrated and described in more detail with reference to FIG. 21. Implementations of the example environment 200 can include different and/or additional components or can be connected in different ways.

The prompt 202 refers to an input (e.g., text, image, audio, video, multi-modal) that guides the media generation platform 110 in generating a specific output. For example, the prompt 202 is a sentence or paragraph describing the image to be created. The prompt 202 can be implemented as a string of text that is fed into the text encoders of the media generation platform 110. The prompt 202 can be processed through two text encoders: a first text encoder 204 (e.g., CLIP text encoder) and a second text encoder 206 (e.g., a T5 text encoder). A text encoder refers to a neural network that converts text into a numerical representation that captures its semantic meaning. The CLIP text encoder can be trained to create representations of visual concepts, and can be implemented using a transformer architecture, such as one with 12 layers and a hidden size of 868 dimensions. The T5 encoder can be implemented as an encoder-decoder model. In some implementations, only the encoder part is used (e.g., one with 12 layers and a hidden size of 868 dimensions).

The first text encoder 204, such as the CLIP text encoder, feeds the input prompt 202 through transformer layers which use self-attention mechanisms to identify and compare relationships between different parts of the input prompt 202. Self-attention enables the media generation platform 110 to weigh the importance of different words in the context of others and thus generate a context-aware representation. The output of the CLIP encoder can be a high-dimensional vector (such as one with 868 dimensions) that represents the semantic content of the text. The second text encoder 206, such as the T5 encoder, can have a different pre-training objective or architecture. The output of the T5 encoder can be another high-dimensional vector representation of the text.

The outputs of these text encoders can be fed through multilayer perceptrons (MLPs). An MLP refers to defined as a neural network that includes multiple layers of nodes, where each node in one layer is communicatively connected to every node in the subsequent layer. The first MLP 208 can apply, on the CLIP encoder output, a series of linear transformations with non-linear activation functions (such as Rectified Linear Unit (ReLU)) between them. ReLU refers to an activation function that outputs the input directly if it is positive, and zero otherwise. The media generation platform 110 can adjust the dimensionality of the representation or emphasize certain features.

The second MLP 214 can apply the transformations on other inputs including guidance 210 and/or timestep 212 information. Guidance 210 can be defined as a numerical parameter that influences how closely the generated image adheres to the text description and can be implemented as a scalar value that is used to scale the influence of the text embedding during the image generation. The timestep 212 can be defined as an integer value indicating the current step in the diffusion process. The timestep 212 informs the media generation platform 110 about how much denoising should occur at this stage and can be implemented as a positional encoding that is added to the input of each transformer block.

The media generation platform 110 can include position identifiers 216 and a ROPE engine 218. Position identifiers 216 can be defined as signals that provide information about the spatial arrangement of elements in the generated image. Position identifiers 216 can be implemented as learned embeddings or fixed sinusoidal patterns that are added to the input at each layer. The ROPE engine 218 implements rotary position embeddings, which encodes relative positional information directly into the model's attention computations. The ROPE engine 218 can apply a rotation to the query and key vectors in the attention mechanism, with the rotation angle determined by the position and dimension of the vector elements.

The multimodal diffusion transformer blocks 220 (e.g., 220*a* through 220*n*) and single instance diffusion transformer blocks 222 (e.g., 222*a* through 222*n*) refer to diffusion transformer blocks that combine transformer architecture with the techniques of diffusion models to iteratively refine (i.e., via denoising) an image representation. The multimodal diffusion transformer blocks 220 and single instance diffusion transformer blocks 222 can each include self-attention layers, which enable different parts of the image representation to interact, and cross-attention layers, which incorporate information from the text encodings.

The output from the multimodal diffusion transformer blocks 220 and single instance diffusion transformer blocks 222 can be input into the modulation engine 224 to perform adaptive instance normalization or feature-wise linear modulation. Modulation refers to adjusting the statistics of feature maps based on style information derived from the text encodings. In other words, specific style elements mentioned in the text are incorporated into the visual representation of the image. Adaptive instance normalization, for example, can be implemented by normalizing the feature maps and then scaling and shifting the feature maps using parameters derived from the text encoding. A linear transformation 226 can be applied to map the features to the output space. Thus, the output latent representation 228 is a high-dimensional tensor representing the generated image in a latent space. The output latent representation 228 can be used as a subsequent input latent representation 230 to iteratively process the image (e.g., the output latent representation 228 can represent a partially denoised image).

The final output latent representation 228 can be input into the VAE 234, which decodes the latent representation into a pixel-space image (i.e., the try-on image 236). The VAE 234 refers to a neural network trained to encode data into a latent space and then decode it back to its original form. The VAE decoder of the VAE 234 can be used to convert the abstract latent representation into a concrete image and can be implemented using a series of transposed convolutions or upsampling layers, which progressively increase the spatial resolution of the image while decreasing its channel depth. The output of the VAE 234, or the try-on image 236, refers to the generated image that matches the description provided in the initial prompt 202. In some implementations, the try-on image 236 is represented as a tensor with dimensions (n, c, 2h, 2w), where 'n' is the batch size (number of images generated simultaneously), 'c' represents the RGB color channels, and '2h' and '2w' indicate that the output image dimensions are 16 times the height and width of the input latent representation. For example, if the latent representation has spatial dimensions of 128×128, the output image is 1024×1024 pixels.

Figure 3:
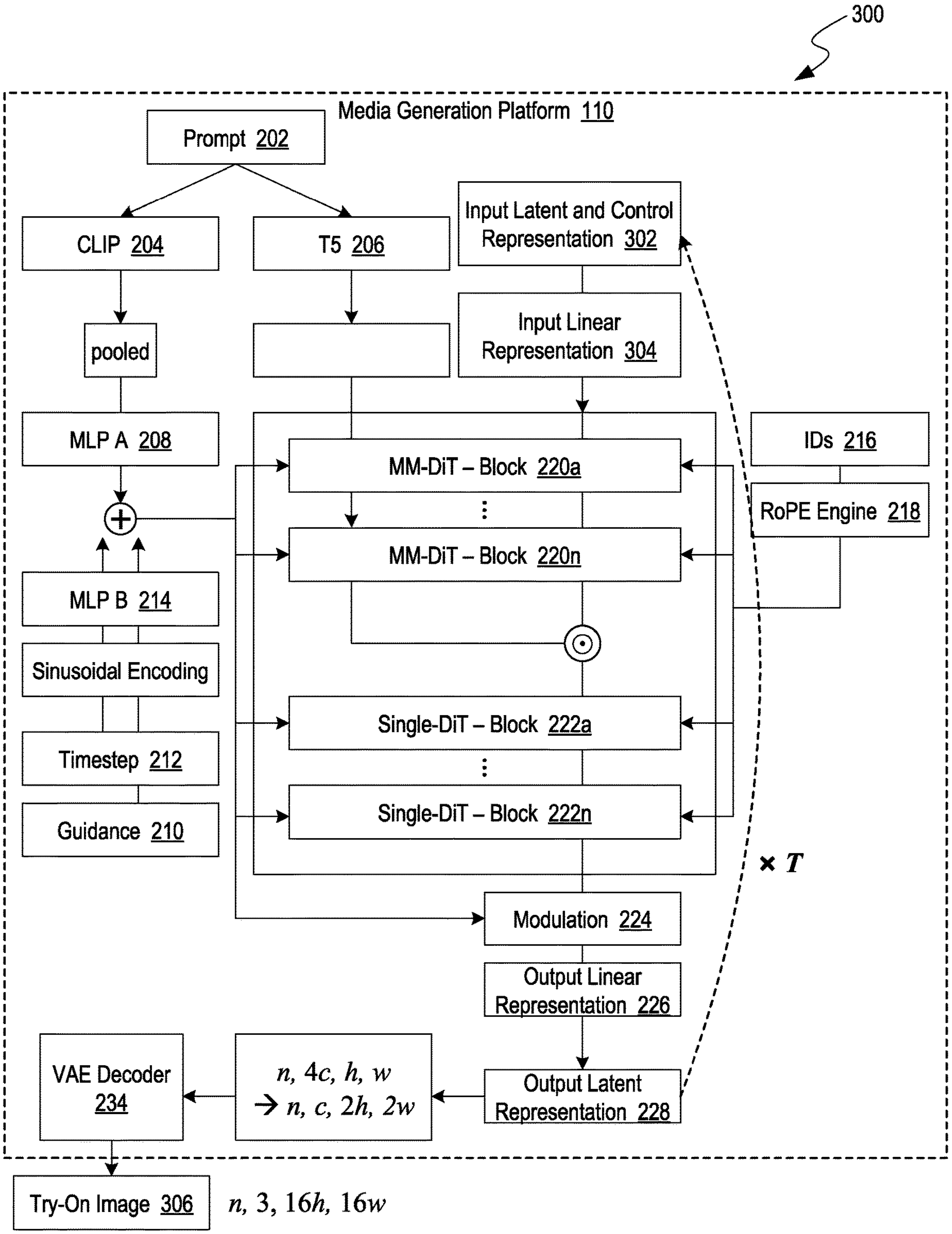
FIG. 3 illustrates an example environment of an image control model of a media generation platform for generating an image from a natural language prompt and a structural input (e.g., a Canny filter), in accordance with some implementations of the technology.

FIG. 3 illustrates an example environment 300 of an image control model of the media generation platform 110 for generating an image from a natural language prompt and a structural input (e.g., a Canny filter), in accordance with some implementations of the technology. Environment 300, as compared to the environment 200 replaces the input latent representation 230 with an input latent and control representation 302 and replaces the input linear representation 232 of the input latent representation 230 with an input linear representation 304 of the input latent and control representation 302. Thus, the media generation platform 110 is enabled to generate a try-on image 306. Implementations of the example environment 300 can include different and/or additional components or can be connected in different ways.

The input latent and control representation 302 can be generated by transforming the structural input using the media generation platform 110. In some implementations, a Canny edge detection filter is applied to a reference image, through convolutional layers to encode the structural input into a latent space compatible with the image latent representation. The encoded control information can be concatenated or element-wise added to the image latent representation. For example, if the latent representation has dimensions of 64×64 pixels, the control information can be encoded to the same dimensions and combined to generate a tensor that captures both the image content and the desired structural guidance.

To generate the input linear representation 304 of the input latent and control representation 302, the input latent and control representation 302 can be passed through a linear layer or a neural network to map the input latent and control representation 302 to a particular dimensionality and/or format used by the subsequent diffusion transformer blocks. Methods of generating the input linear representation 304 from the input latent and control representation 302 are the same as or similar to generating the input linear representation 232 from the input latent representation 230. Thus, the media generation platform 110 is enabled to generate the try-on image 306 that not only matches the textual description from the prompt but also adheres to the structural guidance provided by the input linear representation 304. The try-on image 306 combines the desired content described in the text prompt with the structural characteristics specified by the input latent and control representation 302.

Figure 4:
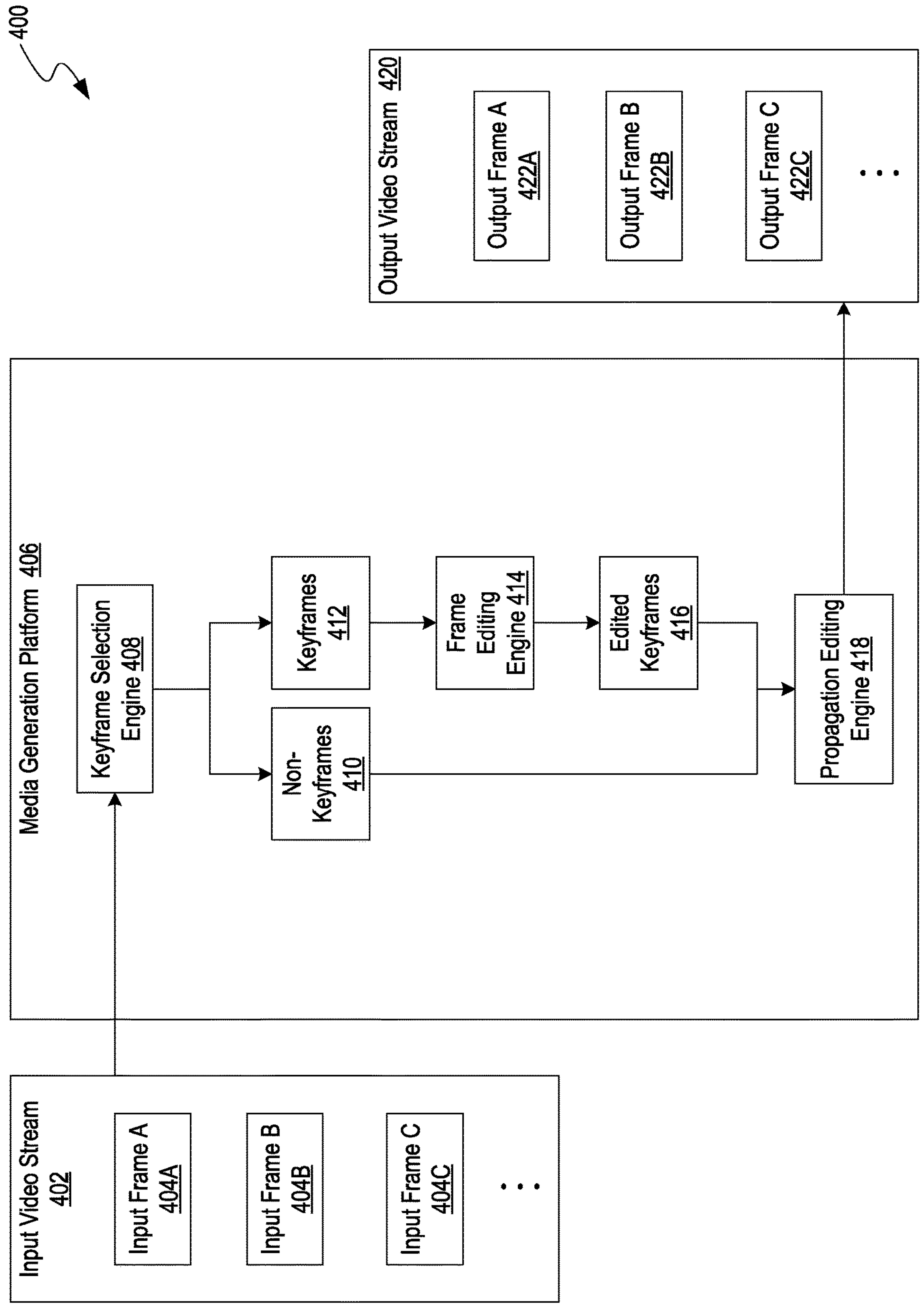
FIG. 4 illustrates an example environment of editing a video stream using a media generation platform, in accordance with some implementations of the technology.

FIG. 4 illustrates an example environment 400 of editing a video stream using a media generation platform, in accordance with some implementations of the technology. The environment 400 can be implemented using components of example computer system 2100 illustrated and described in more detail with reference to FIG. 21. Implementations of the example environment 400 can include different and/or additional components or can be connected in different ways.

An input video stream 402 can include a plurality of frames 404, such as a first input frame 404A, a second input frame 404B, a third input frame 404C, and so forth. The frames 404 represent sequential images captured over time, such as from a live camera feed, a buffered video file, a network-delivered stream, or the like. The input video stream 402 is input into a keyframe selection engine 408 of a media generation platform 406. The media generation platform 406 is the same as or similar to the media generation platform 110 described with reference to FIG. 1.

The keyframe selection engine 408 can evaluate the frames 404 and determines which frames to designate as non-keyframes 410 and which frames to designate as keyframes 412. In some implementations, the keyframe selection engine 408 selects keyframes 412 at a fixed interval, such as every X frame in the input video stream 402. In some implementations, the keyframe selection engine 408 selects keyframes 412 based on a detected change in the input video stream 402, such as a change in user pose, a change in camera angle, or a change in scene content that exceeds a threshold. For example, the keyframe selection engine 408 can compare a similarity metric (e.g., a pixel-level difference, a structural similarity index, or a feature-level distance) between consecutive frames 404 and designate a frame as a keyframe 412 when the similarity metric falls below a threshold value. The non-keyframes 410 are the remaining frames 404 that are not designated as keyframes 412.

The keyframes 412 can operate as input into a frame editing engine 414 of the media generation platform 406. The frame editing engine 414 can apply one or more AI models to generate edited keyframes 416 in which the visual content of the keyframes 412 has been modified. In some implementations, the frame editing engine 414 generates the edited keyframes 416 using the same or similar models and methods as described with reference to FIGS. 1-3 and 6. For example, the frame editing engine 414 can use a diffusion model to iteratively denoise a latent representation of a keyframe 412 in accordance with a constructed prompt, as described with reference to FIG. 1. The frame editing engine 414 can use segmentation models (e.g., the M2FP model) to identify specific body regions within the keyframe 412, generate masks for those regions, and redraw the masked regions using a product image as a conditioning signal. In this approach, the frame editing engine 414 can copy the foreground of the person image, generate a mask for objects such as clothing, hands, and legs, and redraw the masked region using the foreground of the product image.

In some implementations, the frame editing engine 414 generates the edited keyframes 416 by editing the entire image of the keyframe 412 rather than editing individual masked regions. In this approach, the frame editing engine 414 can receive one or more reference images (e.g., a garment catalog image, a user image) and a text instruction describing the desired edit. The frame editing engine 414 can encode the keyframe 412 into a latent representation using an encoder, modify the latent representation based on the reference images and the text instruction, and decode the modified latent representation into the edited keyframe 416 using a decoder. In this approach, a generation model within the frame editing engine 414 can evaluate the reference images to identify visual attributes (e.g., garment texture, color, pattern, silhouette) and transfer those attributes onto the person in the keyframe 412 by regenerating the entire image.

In some implementations, the generation model within the frame editing engine 414 can determine, for each region of the output image, which reference image provides desired visual information. For example, the generation model can encode each reference image into a set of feature maps using an encoder, and for each spatial location in the output latent representation, the generation model can determine/generate an attention score between the output location and each reference feature map. The attention score indicates how visually relevant each reference image is to that particular location in the output. The generation model can weight the visual features from each reference image according to the attention scores and combine the weighted features to produce the output features for that location. The generation model can then decode the combined output features into the edited keyframe 416 to produce an output in which the garment, background, lighting, and/or person are integrated as a single generated image rather than a composite of separately edited regions.

The edited keyframes 416 and the non-keyframes 410 operate as input into a propagation engine 418 of the media generation platform 406. The propagation engine 418 generates an output video stream 420 that includes a plurality of output frames 422, such as a first output frame 422A, a second output frame 422B, a third output frame 422C, and so forth. For the edited keyframes 416, the propagation engine 418 can pass the edited keyframes 416 through to the output video stream 420 directly or with additional refinement. For the non-keyframes 410, the propagation engine 418 can generate corresponding output frames 422 by propagating the edits from a nearest edited keyframe 416 to the non-keyframe 410. For example, the propagation engine 418 can estimate the motion between the edited keyframe 416 and the non-keyframe 410 (e.g., optical flow, feature tracking, or correspondence maps) to determine the displacement of pixels from one frame to the next. Based on the estimated motion, the propagation engine 418 can warp the edited keyframe 416 by shifting pixels according to the motion vectors to generate the output frame 422 for the non-keyframe 410. The propagation engine 418 can apply a lightweight refinement to the warped output frame 422 to, for example, correct boundary artifacts, update occlusions, and/or remove color and lighting inconsistencies introduced by the warping. The output video stream 420 can be displayed on a user interface of a computing device or transmitted to a downstream application.

Figure 5:
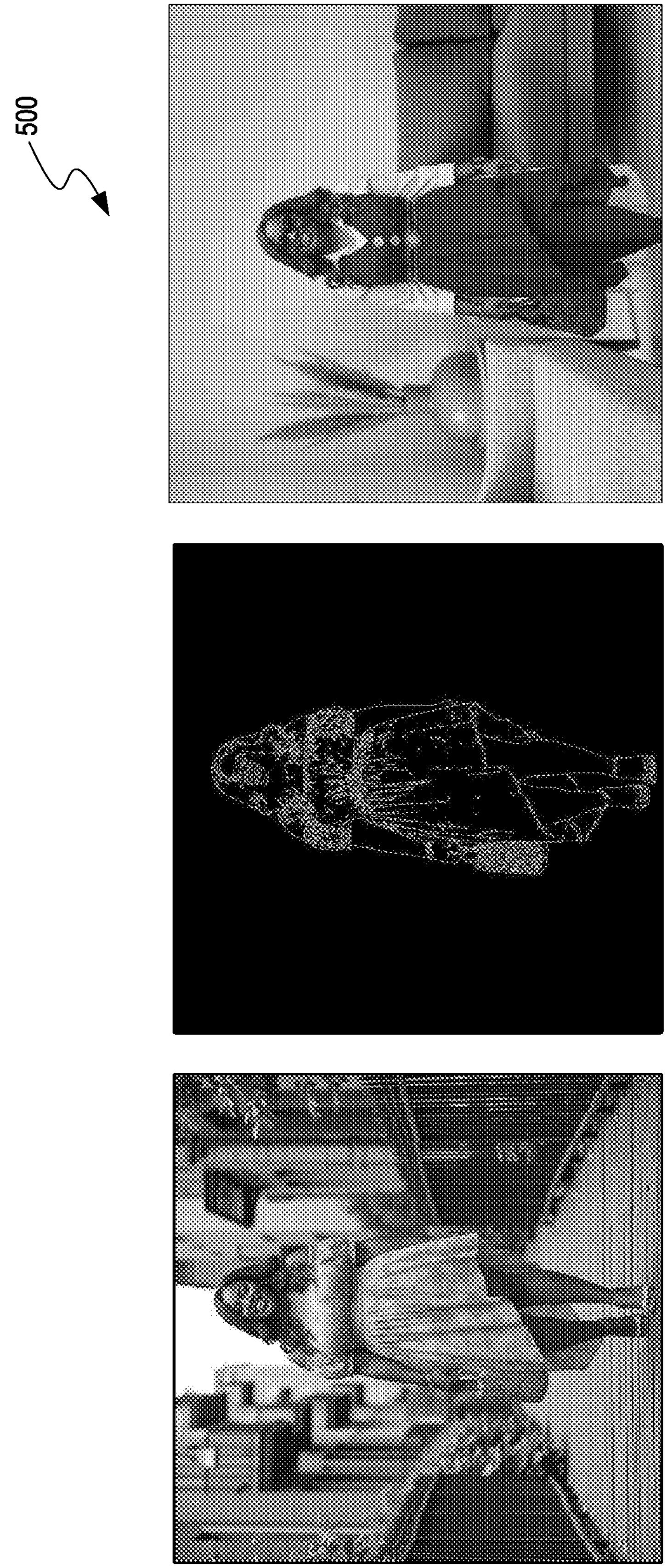
FIG. 5 illustrates an example environment of an image generated using the image control model of a media generation platform, in accordance with some implementations of the technology.

FIG. 5 illustrates an example environment 500 of an image generated using the image control model of the media generation platform 110 of FIG. 3, in accordance with some implementations of the technology. The example environment 500 includes a user image 502, a user outline 504 (e.g., a Canny filter), and a generated image 506. The environment 500 can be implemented using components of example computer system 2100 illustrated and described in more detail with reference to FIG. 21. Implementations of the example environment 500 can include different and/or additional components or can be connected in different ways.

The user image 502 refers to the input (e.g., the prompt 202 in in FIG. 2 and FIG. 3) to the media generation platform 110. The user image 502 can include, for example, a full-body or partial-body photograph of a person to be used as a reference for generating a new image (e.g., the try-on image 236, 306 in FIG. 2 and FIG. 3 respectively). The user outline 504 can be derived from the user image 502 using edge detection techniques, such as a Canny filter, by detecting a range of edges in images and using the range of edges to generate a structural representation of the user's pose and body shape. For example, the media generation platform 110 can generate a binary image where edges are represented as white lines on a black background. The user outline 504 can be used as the control input in the media generation platform 110 to maintain the overall structure and/or pose of the user image 502. The generated image 506 refers to the output produced by the media generation platform 110. The generated image 506 combines the structural information from the user outline 504 with new content specified by a text prompt (not shown in the figure). For example, in FIG. 5, the generated image 506 maintains pose and general structure of the original user image while replacing pixels of the user image 502 to display different clothing and backgrounds.

Figure 6:
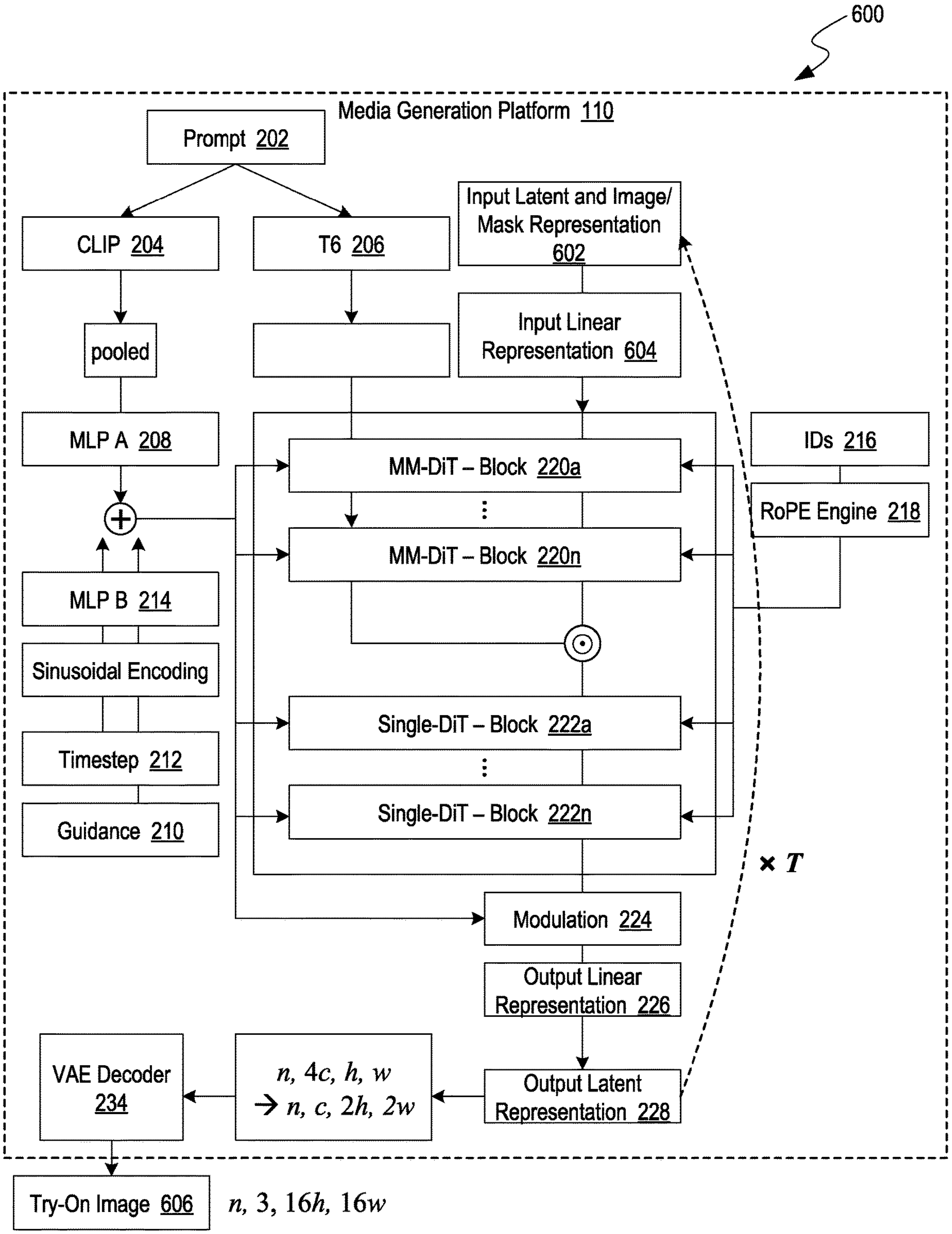
FIG. 6 illustrates an example environment of a fill model of a media generation platform for filling or replacing masked regions of an image, in accordance with some implementations of the technology.

FIG. 6 illustrates an example environment 600 of a fill model of the media generation platform 110 for filling or replacing masked regions of an image, in accordance with some implementations of the technology. Environment 600, as compared to environment 200, replaces the input latent representation 230 with an input latent and image/mask representation 602 and replaces the input linear representation 232 of the input latent representation 230 with an input linear representation 604 of the input latent and image/mask representation 602. Thus, the media generation platform 110 is enabled to generate a try-on image 606. Implementations of the example environment 600 can include different and/or additional components or can be connected in different ways.

The input latent and image/mask representation 602 enables the media generation platform 110 to specifically regenerate and/or replace pixels located in particular areas of the image (e.g., the user image 502 in FIG. 5). For example, the input latent and image/mask representation 602 includes a binary mask that defines which regions of the image are to be modified. The mask can include a black and white image where white areas indicate regions to be filled or replaced, and black areas represent regions to be preserved. The input linear representation 604 of the input latent and image/mask representation 602 indicates the combined latent, image, and mask data. To generate the input linear representation 604 of the input latent and control representation 302, the input linear representation 604 can be passed through a linear layer or a neural network to map the input latent and control representation 302 to a particular dimensionality and/or format used by the subsequent diffusion transformer blocks. Methods of generating the input linear representation 604 from the input latent and control representation 302 are the same as or similar to generating the input linear representation 232 from the input latent representation 230.

As a result of these modifications, the media generation platform 110 is enabled to generate a try-on image 606 that selectively modifies specific regions of the input image based on the provided mask. The try-on image 606 can be an image where masked areas have been filled or replaced with new content that matches the surrounding context and/or satisfies provided textual descriptions or style guidance. The media generation platform 110 can selectively modify images in applications such as image inpainting, object removal, localized style transfer, and so forth. For example, the media generation platform 110 can be used to remove unwanted objects from photographs, fill in missing or damaged parts of images, selectively apply new styles or textures to specific areas of an image, and so forth.

Figure 7:
FIG. 7 illustrates an example environment of an image generated using the fill model of a media generation platform, in accordance with some implementations of the technology.

FIG. 7 illustrates an example environment 700 of an image generated using the fill model of the media generation platform 110 of FIG. 6, in accordance with some implementations of the technology. The example environment 700 includes a user image 702, a mask 704, and a generated image 706. The environment 700 can be implemented using components of example computer system 2100 illustrated and described in more detail with reference to FIG. 21. Implementations of the example environment 700 can include different and/or additional components or can be connected in different ways. The user image 702 can be a photograph (or other depiction of a user) that operates as the input for the fill model of the media generation platform 110. The mask 704 refers to a binary image that defines the regions of the user image to be modified or filled. In the mask 704 of FIG. 7, white areas (e.g., pixels with a pixel value of 255) indicate regions to be filled or replaced, while black areas (e.g., pixels with a pixel value of 0) represent regions to be preserved. The mask 704 can be generated based on user input and has the same dimensions as the user image. The generated image 706 refers to the output produced by the fill model of the media generation platform 110 that combines the unmasked portions of the user image 702 with newly generated content in the masked regions. Methods of using the fill model to generate the generated image 706 are discussed in further detail with reference to FIG. 6. The generated image 706 can maintain the resolution, color depth, texture, lighting, style, and so forth of the user image 702.

Figure 8:
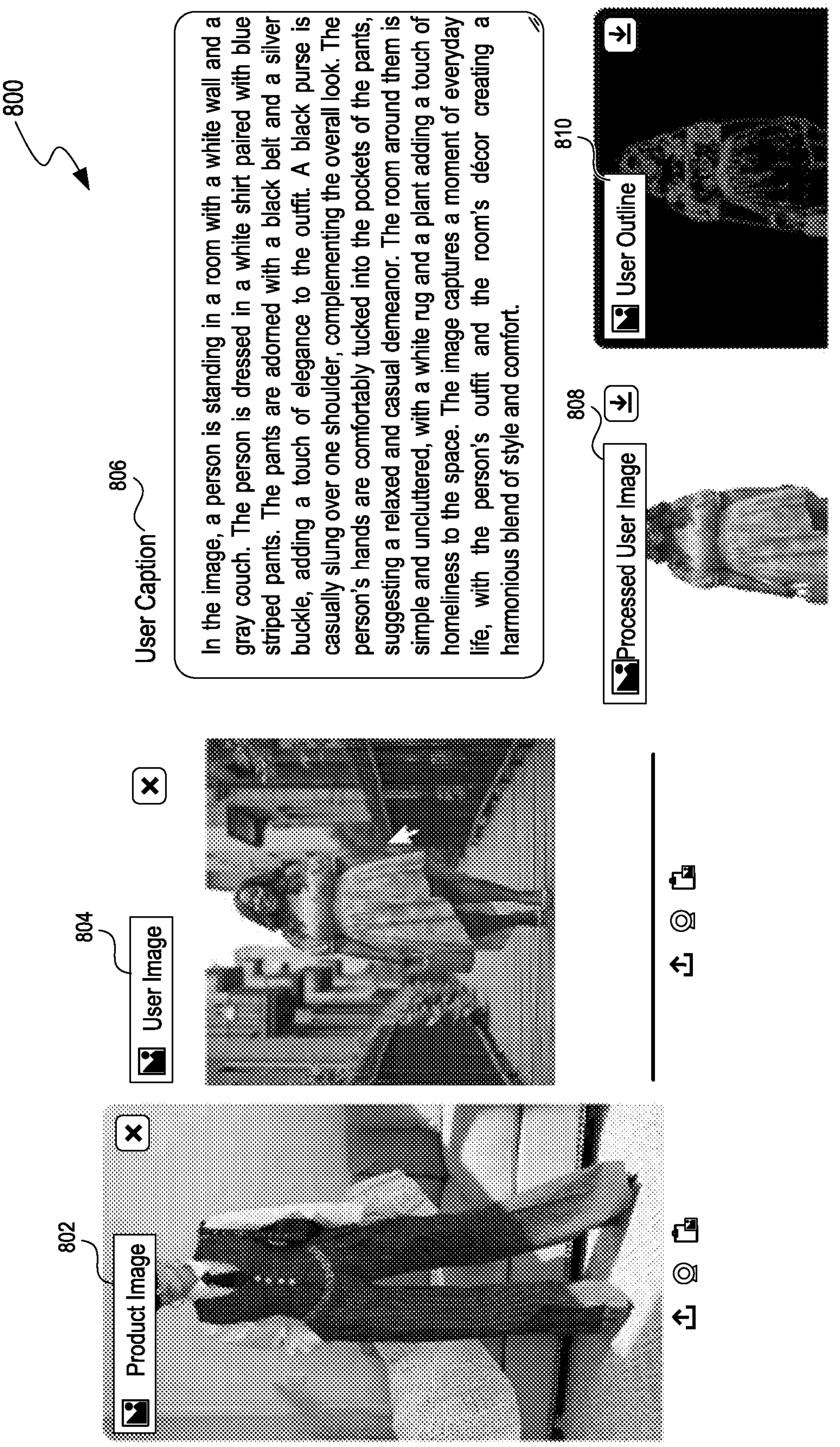
FIG. 8 illustrates an example environment of generating a product image caption from a product image using a media generation platform, in accordance with some implementations of the technology.

FIG. 8 illustrates an example environment 800 of generating a product image caption/description from a product image using the media generation platform 110, in accordance with some implementations of the technology. Similar methods can be used to generate a person image caption from a person image using the media generation platform. Descriptions can include, for example, natural language captions, images, audio, video, and other content providing context for the corresponding person/product. The example environment 800 includes a product image 802, a user image 804 (e.g., the user image 502 and user image 702 in FIGS. 5 and 7, respectively), a product image caption 806, a processed user image 808 and a user outline 810 (e.g., a Canny filtered image). The environment 800 can be implemented using components of the example computer system 2100 illustrated and described in more detail with reference to FIG. 21. Implementations of the example environment 800 can include different and/or additional components or can be connected in different ways.

The product image 802 can be a digital photograph of a specific item, such as clothing or accessories, intended for virtual try-on. For example, in FIG. 8, the product image 802 displays a pinstriped vest/waistcoat with blue footwear visible at the bottom to be used as the reference item for the virtual try-on. The user image 804 can be a full-body photograph of the individual who will be the subject of the virtual try-on. For example, in FIG. 8, the user image 804 depicts a person in a room with a white wall and a gray couch while dressed in a white shirt paired with blue striped pants, and provides the base appearance and context for the virtual try-on.

The media generation platform 110 is enabled to generate the product image caption 806 from the product image 802. The product image caption 806 refers to a textual description of the product image 802 (e.g., produced by an image-to-text model of FIG. 1). The product image caption 806 can include details about the person's appearance, clothing, pose, surroundings, and so forth. For example, in FIG. 8, the product image caption 806 provides a textual description of the product image, mentioning the white shirt and blue striped pants, the person's pose in a room with a white wall and a gray couch. Using the product image caption 806 that describes the target outcome, the media generation platform 110 is enabled to generate the processed user image 808 to depict the same person from the user image 804, but with the background removed, thus isolating the figure against a neutral backdrop. The processed user image 808 can be used to generate the user outline 810 by applying a Canny filter to produce a binary image highlighting the edges and contours of the subject. For example, in FIG. 8, the user outline 810 is presented as a black and white silhouette that captures the overall shape and pose of the person, including the outline of the flowy dress and the position of the arms holding the bags.

Figure 9:
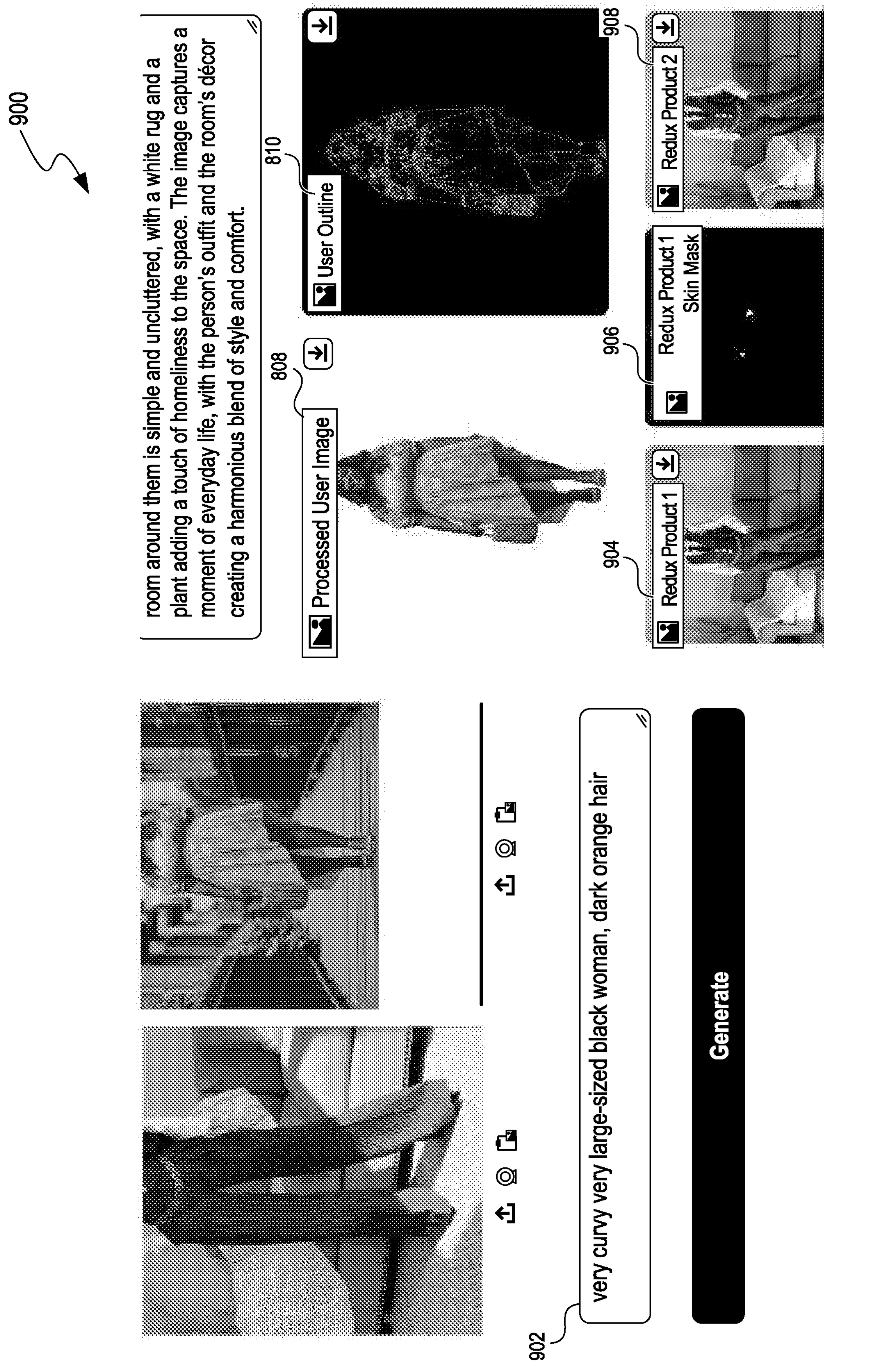
FIG. 9 illustrates an example environment of additional context used by aa media generation platform to generate a try-on digital media, in accordance with some implementations of the technology.

FIG. 9 illustrates an example environment 900 of additional context used by the media generation platform 110 to generate a try-on digital media, in accordance with some implementations of the technology. The example environment 900 includes the processed user image 808 and the user outline 810 from FIG. 8. The example environment 900 further includes additional context 902 (e.g., the additional context 106 in FIG. 1), a first redux product image 904, a redux product skin mask 906, and a second redux product image 908. The environment 900 can be implemented using components of example computer system 2100 illustrated and described in more detail with reference to FIG. 21. Implementations of the example environment 900 can include different and/or additional components or can be connected in different ways.

The additional context 902 can include metadata or textual information configured to provide additional conditioning signals to the media generation platform 110 (e.g., in addition to the product image 804 and the user image 802). The additional context 902 can be implemented in the form of JSON data, key-value pairs, and/or natural language descriptions. In FIG. 9, the additional context 902 is represented as a body of text describing the user image 802 (e.g., size information, color information, texture information, and so forth). The first redux product image 904 refers to a virtual try-on image displaying the product within the product image 804 on the user within the user image 802. In FIG. 9, the first redux product image 904 displays a piece of blue denim clothing (i.e., the product within the product image 802) on the user within the user image 804. However, the skin tone may not be accurate. For example, in FIG. 9, the hands of the first redux product image 904 are lighter colored, whereas the user image 804 and the additional context 902 specify the user as black colored.

In some implementations, the fine-tuning model used to correct the skin tone comprises a conditional generative adversarial network (cGAN) trained on skin tone pairs. The cGAN can receive as input the first redux product image 904 and a target skin tone extracted from the person image 104, and can generate an output image in which the skin tone of the person in the first redux product image 904 is modified to match the target skin tone while preserving other visual attributes such as texture, lighting, and clothing details.

Thus, to correct the skin tone of the first redux product image 904, the media generation platform 110 can use a fine-tuning model to generate the redux product skin mask 906. The redux product skin mask 906 can refer to a grayscale or binary image indicating areas of the product that should interact with the user's skin tone. The redux product skin mask 906 can be generated manually or through automated segmentation techniques. In FIG. 9, the redux product skin mask 906 is displayed as a black and white image where white areas represent regions that should adapt to the user's skin tone. The second redux product image 908 refers to the output of the fine-tuning model(s) of the media generation platform 110 that implements the skin tone correction of the redux product skin mask 906.

Figure 10:
FIG. 10 illustrates an example environment of pre-processing an input image by resizing the input image, in accordance with some implementations of the technology.
Figure 10:
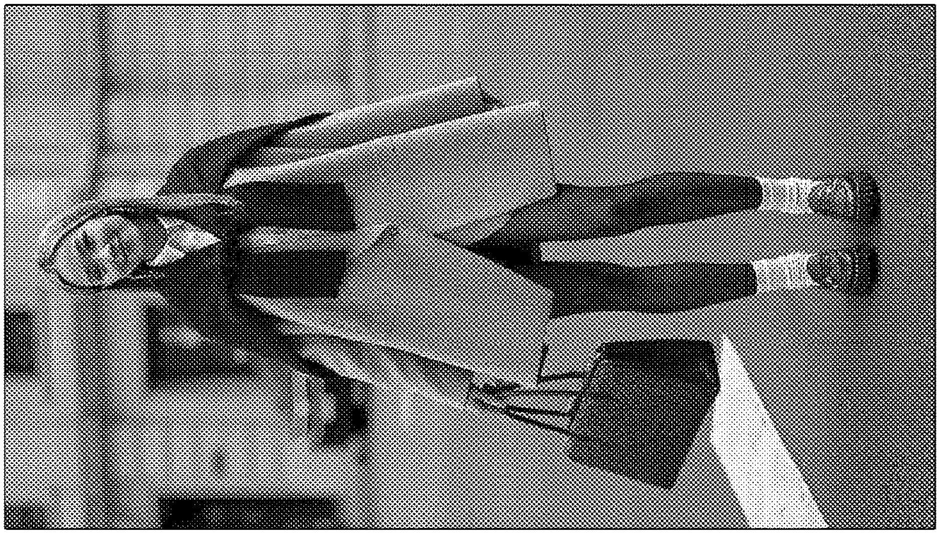

FIG. 10 illustrates an example environment 1000 of pre-processing an input image by resizing the input image, in accordance with some implementations of the technology. The example environment 1000 includes an input image 1002 (e.g., a person image and/or a product image) and a resized image 1004. The environment 1000 can be implemented using components of example computer system 2100 illustrated and described in more detail with reference to FIG. 21. Implementations of the example environment 1000 can include different and/or additional components or can be connected in different ways. The input image 1002 can include a user/person/subject image (such as a photograph of a person) or a product image (such as a clothing item or accessory). The input image 1002 can be in various formats such as JPEG, PNG, or TIFF. The media generation platform 110 is enabled to standardize the image dimensions so that the size input image 1002 remains uniform in subsequent stages of the media generation platform. The resized image 1004 refers to a resized version of the input image 1002 to a specific resolution (e.g., 1024×1024 pixels) while maintaining the original content of the input image 1002.

Figure 11:
FIG. 11 illustrates an example environment of pre-processing an input image by removing a background of the input image, in accordance with some implementations of the technology.

FIG. 11 illustrates an example environment 1100 of pre-processing an input image by removing a background of the input image, in accordance with some implementations of the technology. The example environment 1100 includes an input image 1102 (e.g., the input image 1002 in FIG. 10) and a processed image 1104. The environment 1100 can be implemented using components of example computer system 2100 illustrated and described in more detail with reference to FIG. 21. Implementations of the example environment 1100 can include different and/or additional components or can be connected in different ways. The input image 1102 in FIG. 11 depicts a person surrounded by shelves displaying colorful shoes and handbags. The media generation platform 110 is enabled to identify and separate the foreground subject from the background elements to generate the processed image 1104, which depicts the same person now isolated against a clean white background. For example, the media generation platform 110 identifies the main subject (the person) and distinguishes them from the surrounding elements (shelves, products, walls) by mapping each pixel of the image to the person or the background.

The media generation platform 110 can trace the outline of the person based on the mapping and generate a mask that separates the person from the background in the image. The media generation platform 110 can apply the mask to the input image 1102, thus separating the person from their surroundings. The media generation platform 110 can overlay the person (separated from their surroundings) onto a new background (e.g., a white background). In some implementations, the background of the processed image 1104 depicts a blurred version of the original background, a different background, and so forth.

Figure 12:
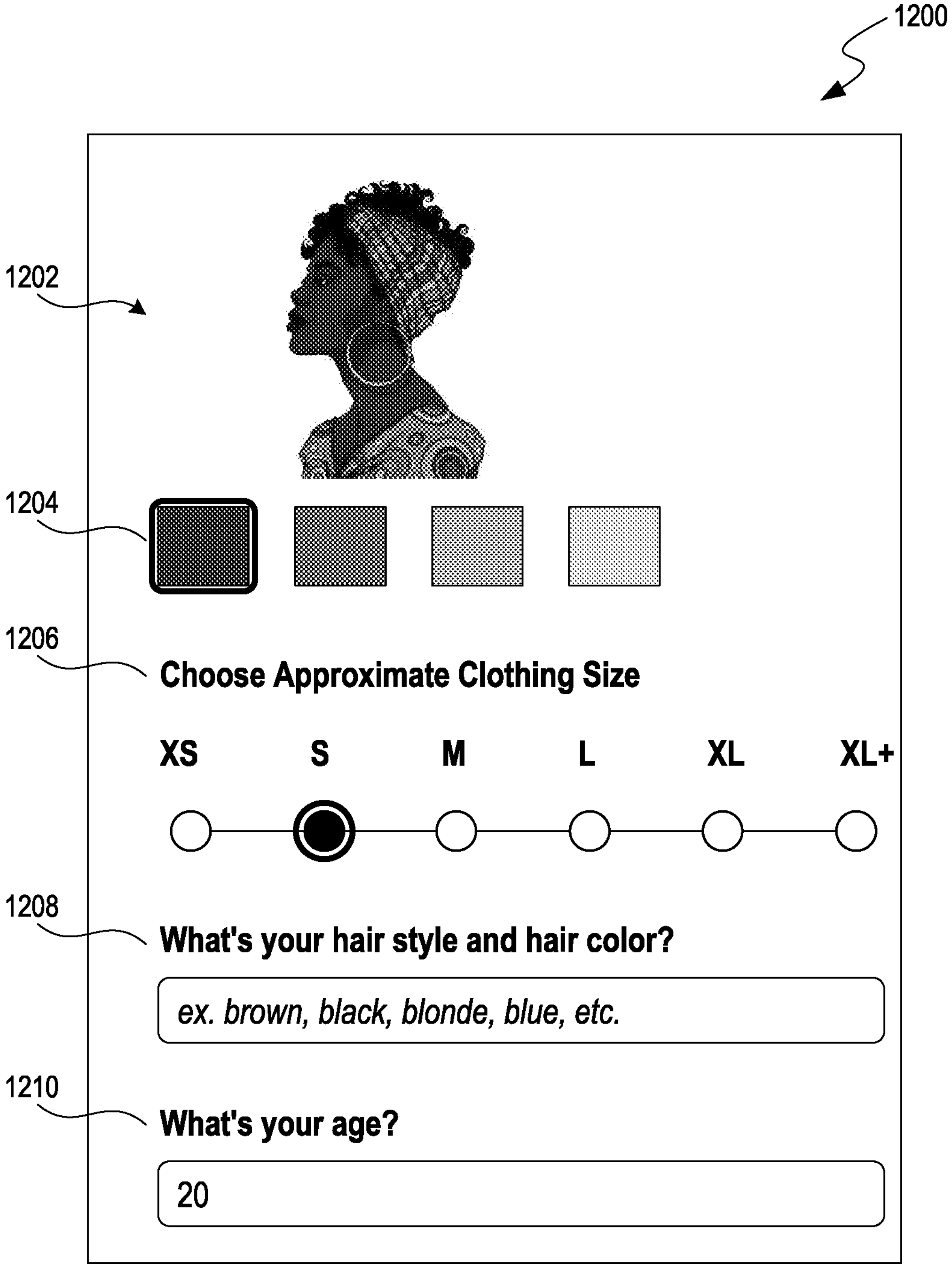
FIG. 12 is a screenshot illustrating an example user interface of a media generation platform displaying context used to generate a try-on digital media, in accordance with some implementations of the technology.

FIG. 12 is a screenshot illustrating an example user interface 1200 of the media generation platform 110 displaying context used to generate a try-on digital media, in accordance with some implementations of the technology. The user interface 1200 includes a person representation 1202, a skin color field 1204, a body size field 1206, a hair appearance field 1208, and an age field 1210. The user interface 1200 can be implemented using components of example computer system 2100 illustrated and described in more detail with reference to FIG. 21. Implementations of the example user interface 1200 can include different and/or additional components or can be connected in different ways. The person representation 1202 can display a stylized illustration of a person's body or portion of the body (e.g., head and upper body). The person representation 1202 can be dynamically updated based on user inputs to reflect changes in skin tone, hair style, or other physical attributes. The skin color field 1204 can present, to the user, a spectrum of skin tone options, which can be displayed as a series of color swatches or a continuous gradient selector. This selector functions as reinforcement of the user preferred colors as the actual skin tone is also extracted from the user image. Users are thus enabled to match their skin tone or experiment with different appearances. The body size field 1206 can provide a range of body type options, which can be displayed on the user interface 1200 as a slider or a series of preset options (e.g., options ranging from extra-small to extra-large). The hair appearance field 1208 can refer to an input area (e.g., a text field) where users can describe their hair style and color in natural language. These also are optional settings-if left blank, the generated image will be based on user's original hair style and color. The age field 1210 is enabled to accept a numerical input for the user's age. The user interface 1200 captures the physical attributes of the user that is subsequently used by the media generation platform 110 to generate try-on image(s).

Figure 13:
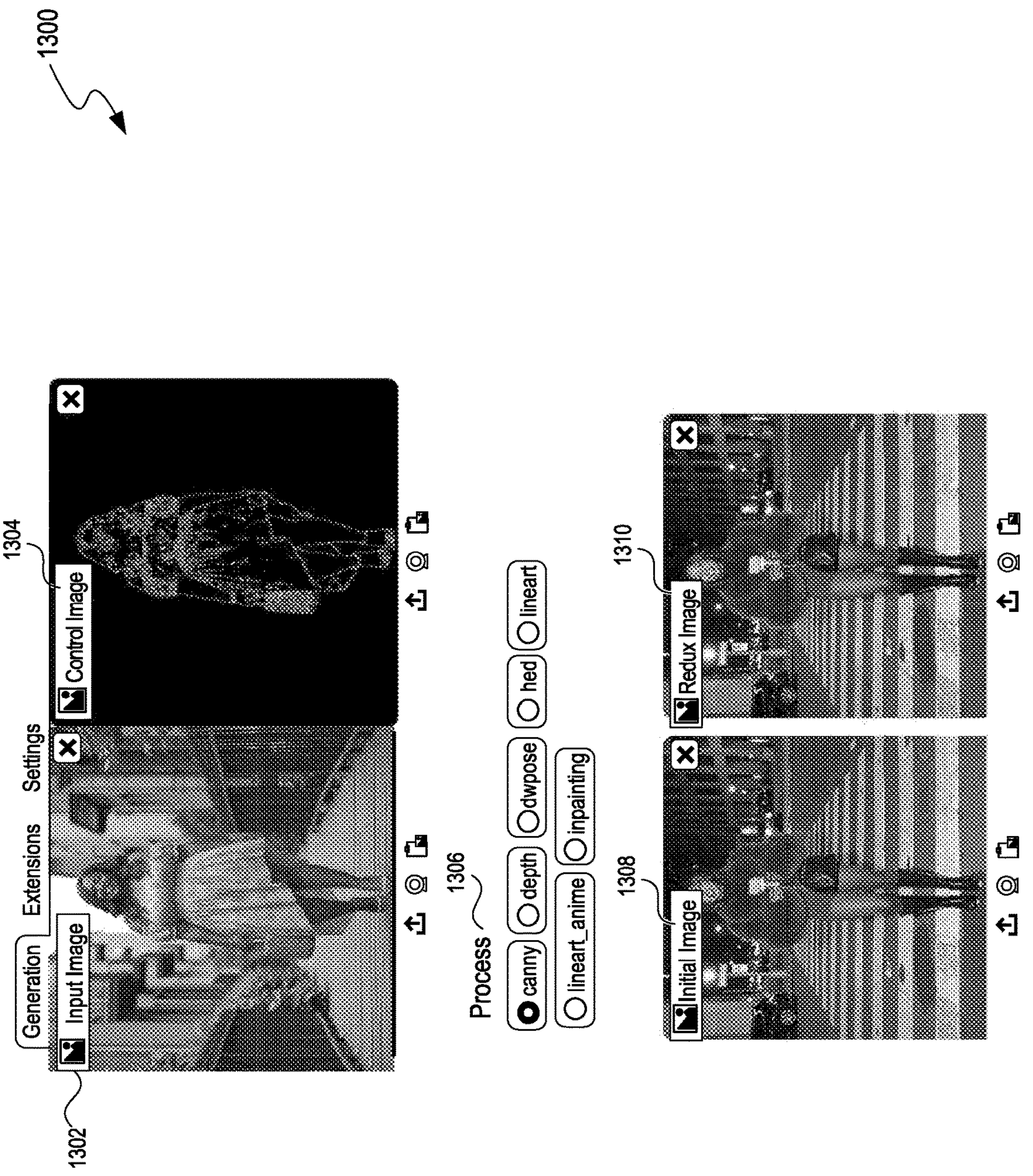
FIG. 13 is a screenshot illustrating an example user interface of a media generation platform displaying an initial try-on digital media, in accordance with some implementations of the technology.

FIG. 13 is a screenshot illustrating an example user interface 1300 of the media generation platform 110 displaying an initial try-on digital media, in accordance with some implementations of the technology. The user interface 1300 includes an input image 1302, a control image 1304, a process selector 1306, an initial try-on image 1308, and a redux try-on image 1310. The user interface 1300 can be implemented using components of example computer system 2100 illustrated and described in more detail with reference to FIG. 21. Implementations of the example user interface 1300 can include different and/or additional components or can be connected in different ways.

The input image 1302, which is a photograph of a person used to create the try-on effect in FIG. 13, is used by the media generation platform 110 to generate the control image 1304 (e.g., via a Canny filter) that outlines of the person's body. The process selector 1306 provides an indication of a set of functions of the media generation platform 110 to manipulate the image. Examples of the set of functions are further discussed with reference to FIGS. 2, 3, and 6. For example, the set of functions can include generating and/or modifying the edges of the input image 1302, adjusting depth perception (e.g., generating a depth map to estimate a relative distance of each pixel from the camera), altering the pose of the person in the picture (e.g., mapping the image pixels to a three-dimensional surface model of the human body by assigning each pixel to a specific body part), and so forth. The initial try-on image 1308 can depict the first (or previous) attempt by the media generation platform 110 at placing the virtual clothing onto the person in the input image. In contrast, the redux try-on image 1310 depicts a fine-tuned version of the initial try-on image 1308 by applying one or more fine-tuning models to, for example, adjust a skin tone or face shape of the person depicted in the initial try-on image 1308.

Figure 14:
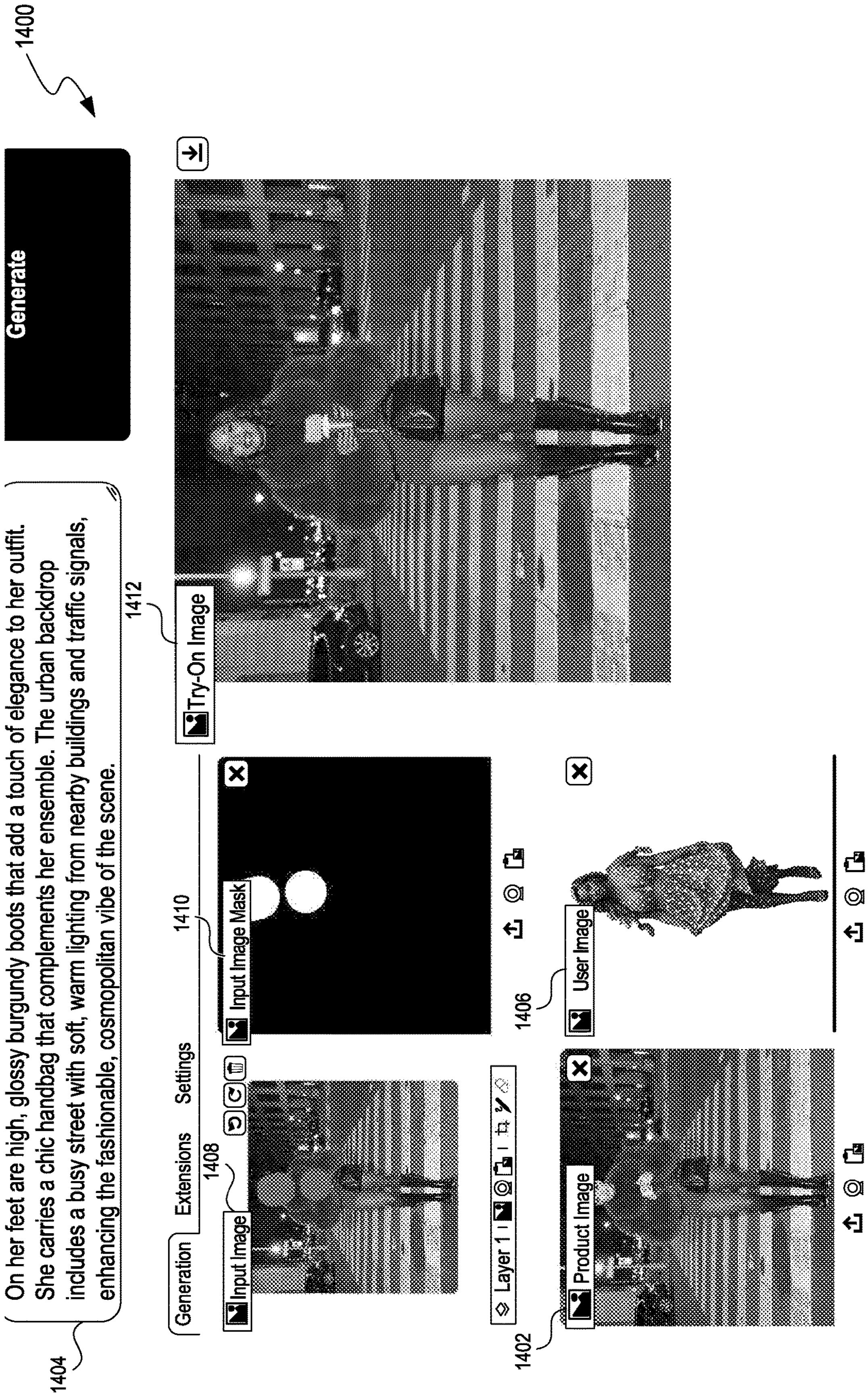
FIG. 14 is a screenshot illustrating an example user interface of a media generation platform displaying a fine-tuned try-on digital media generated using partial masking, in accordance with some implementations of the technology.

FIG. 14 is a screenshot illustrating an example user interface 1400 of the media generation platform 110 displaying a fine-tuned try-on digital media generated using partial masking, in accordance with some implementations of the technology. The user interface 1400 includes a product image 1402, a product image description 1404, an input image 1408, a person image 1406, an input image mask 1410, and a try-on image 1412. The user interface 1400 can be implemented using components of example computer system 2100 illustrated and described in more detail with reference to FIG. 21. Implementations of the example user interface 1400 can include different and/or additional components or can be connected in different ways. The product image 1402, which depicts the garment or accessory to be virtually applied, can be used by the media generation platform 110 to generate the product image description 1404 that provides a natural language description of the product image 1402. The input image 1408 in FIG. 14 can refer to an initial (or previous) generated virtual try-on image of the media generation platform 110. To fine-tune the input image 1408, the media generation platform 110 can generate an input image mask 1410 to selectively indicate areas of the input image where the product should be applied or blended. The media generation platform 110 can apply one or more models (e.g., AI models) to generate the try-on image 1412 where only portions indicated by the input image mask 1410 are re-generated. For example, in FIG. 14, the face and hand portions of the input image 1408 are masked. Thus, only the face and hand portions of the input image 1408 are visually modified in the try-on image 1412.

Figure 15:
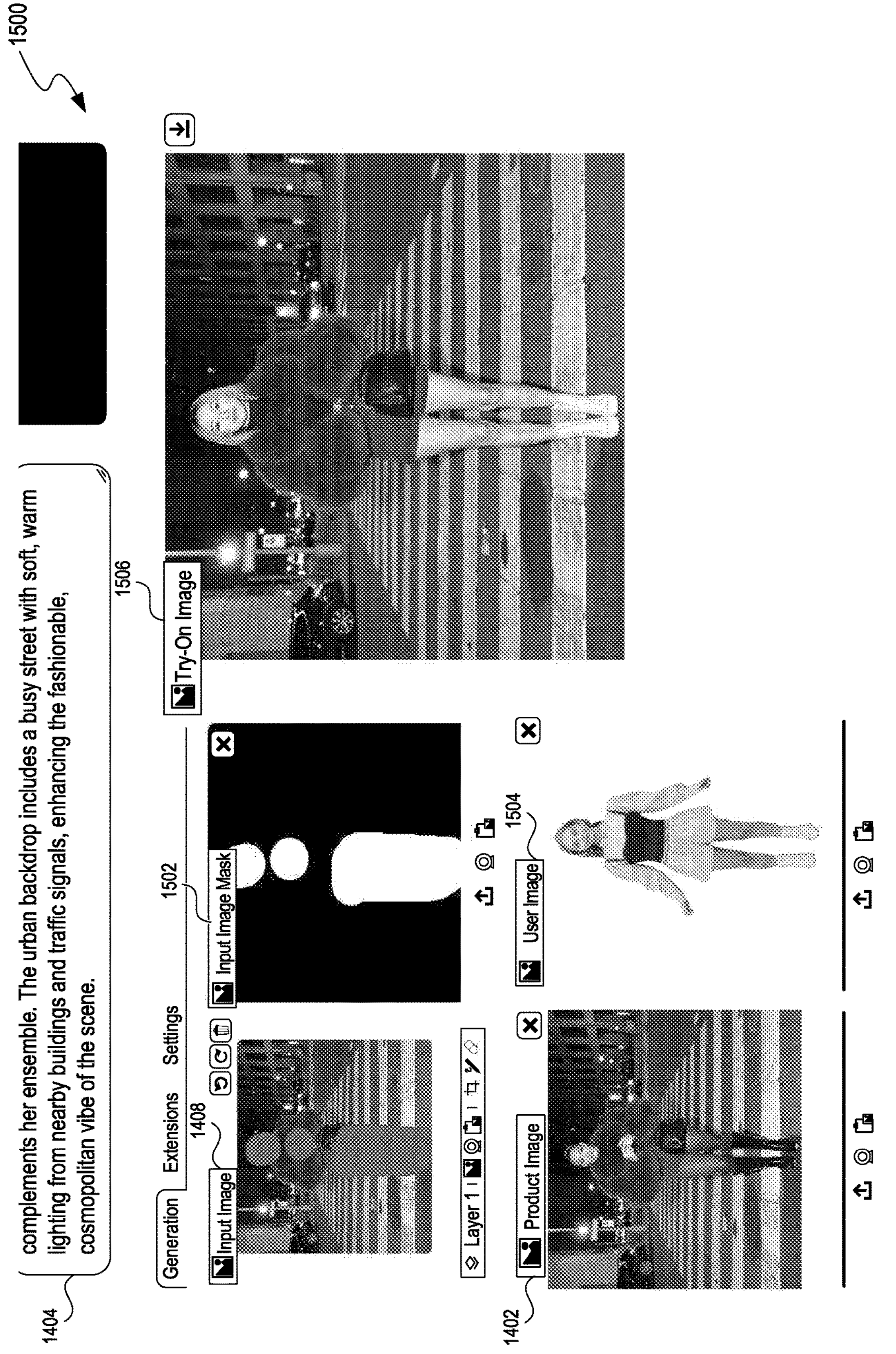
FIG. 15 is a screenshot illustrating an example user interface of a media generation platform displaying a fine-tuned try-on digital media generated using a greater degree of masking than that of FIG. 14, in accordance with some implementations of the technology.

FIG. 15 is a screenshot illustrating an example user interface 1500 of the media generation platform 110 displaying a fine-tuned try-on digital media generated using a greater degree of masking than that of FIG. 14, in accordance with some implementations of the technology. The user interface 1500 includes the product image 1402, the product image description 1404, the input image 1408, a different input image mask 1502, a different person image 1504, and a different try-on image 1506. The user interface 1500 can be implemented using components of example computer system 2100 illustrated and described in more detail with reference to FIG. 21. Implementations of the example user interface 1500 can include different and/or additional components or can be connected in different ways. As opposed to the image mask 1410, the different input image mask 1502 in FIG. 15 covers a larger portion of the input image 1408 by encompassing the leg portion of the person within the input image 1408 as well as the face and hand portions. The increased masking enables the media generation platform 110 to modify greater degrees of alterations to the subject's appearance. The media generation platform 110 uses the different person image 1504 to generate the different try-on image 1506 that displays a greater degree of transformation from the original input image 1408 (e.g., changing the color of the leg portion in FIG. 15).

Figure 16:
FIG. 16 illustrates a difference between a pre-tuned image and a fine-tuned image, in accordance with some implementations of the technology.
Figure 16:

FIG. 16 illustrates a difference between a pre-tuned image and a fine-tuned image, in accordance with some implementations of the technology. FIG. 16 includes a pre-tuned image 1602 (e.g., an initial try-on image) and a tuned image 1604 (e.g., a fine-tuned try-on image). In the pre-tuned image 1602, the facial characteristics can appear generic or misaligned with the subject's appearance in the received user image (not shown in the figure). The face shape in the tuned image 1604 can display adjustments made by the media generation platform 110 to modify the subject's face shape (e.g., bone structure) of the pre-tuned image 1602 to that of the received user image. For example, the media generation platform 110 is enabled to modify the jawline, cheekbone prominence, facial contour, forehead width and shape, and so forth. The eyes can be adjusted in terms of size, shape, and/or positioning to accurately reflect the subject's natural eye structure by, for example, modifying the eyelid shape, the depth of the eye sockets, and/or the positioning of the pupils. Similarly, the nose shape and size can be modified to match the subject's nose in the received user image by adjusting the bridge height, nostril shape, overall nose length, and so forth. Other features that can be modified include, but is not limited to, lips, skin texture, skin tone, hairline, hairstyle, highlights, and so forth.

Figure 17:
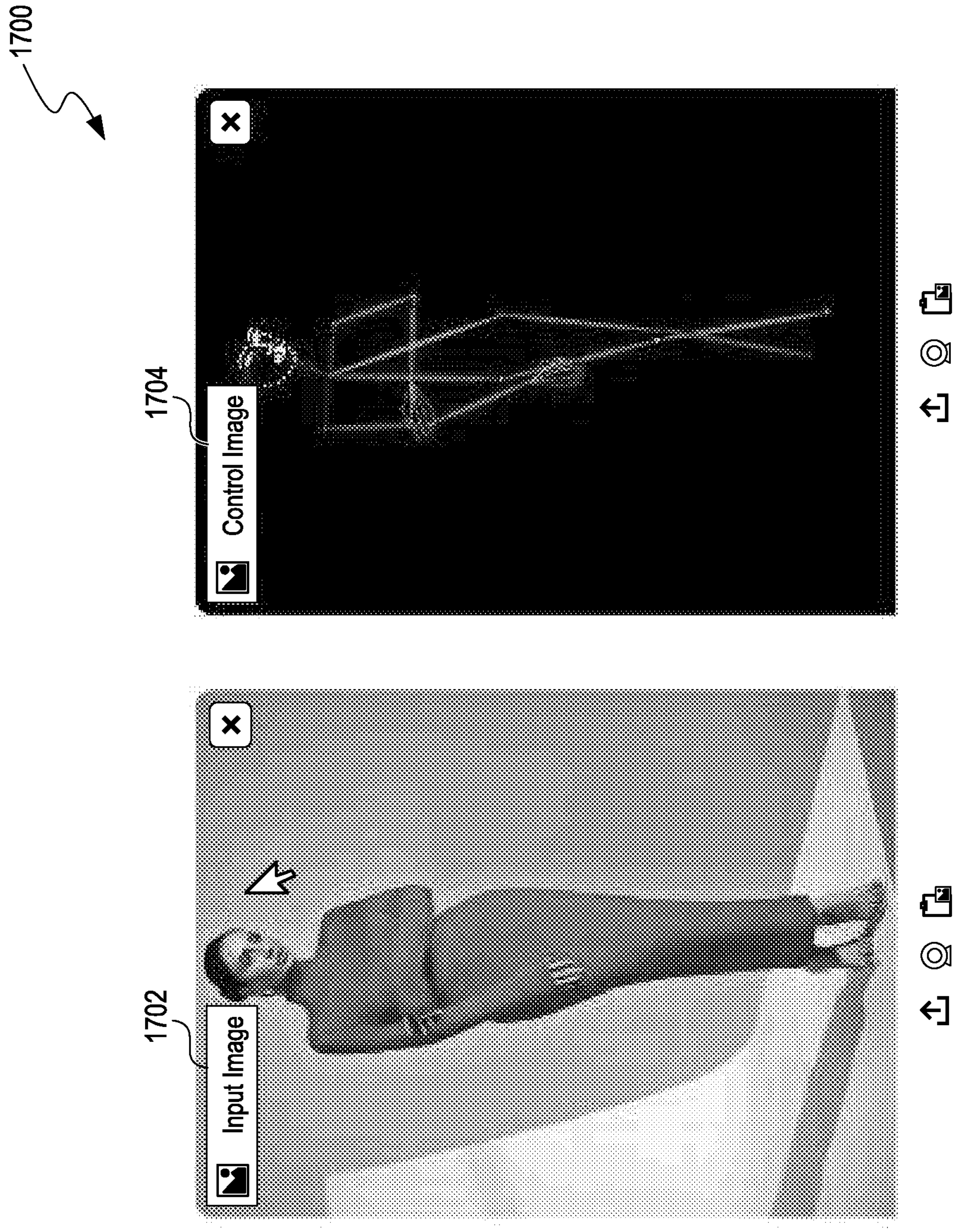
FIG. 17 is a screenshot illustrating an example set of pose controls extracted from an input image, in accordance with some implementations of the technology.

FIG. 17 is a screenshot 1700 illustrating an example set of pose controls extracted from an input image, in accordance with some implementations of the technology. The screenshot 1700 includes an input image 1702 and a control image 1704. The screenshot 1700 can be implemented using components of example computer system 2100 illustrated and described in more detail with reference to FIG. 21. Implementations of the example screenshot 1700 can include different and/or additional components or can be connected in different ways. The input image 1702 in FIG. 17 displays a full-body photograph of a person wearing a red long-sleeved dress against a light background. The control image 1704 presents a corresponding skeletal outline or pose estimation overlay derived from the input image 1702. The control image 1704 can be represented by a series of interconnected lines and joints. The lines and joints can map key anatomical points and body segments to create a simplified representation of the subject's pose and body structure. The control image 1704 captures the subject's stance, limb positions, and/or overall body proportions, which can be used by the media generation platform 110 to guide the application and deformation of virtual clothing items. For example, the media generation platform 110 can adjust a pose of the virtual try-on image (not shown in the figure) by adjusting one or more pixels of the virtual try-on image in accordance with a mapped structure of the control image 1704.

Figure 18:
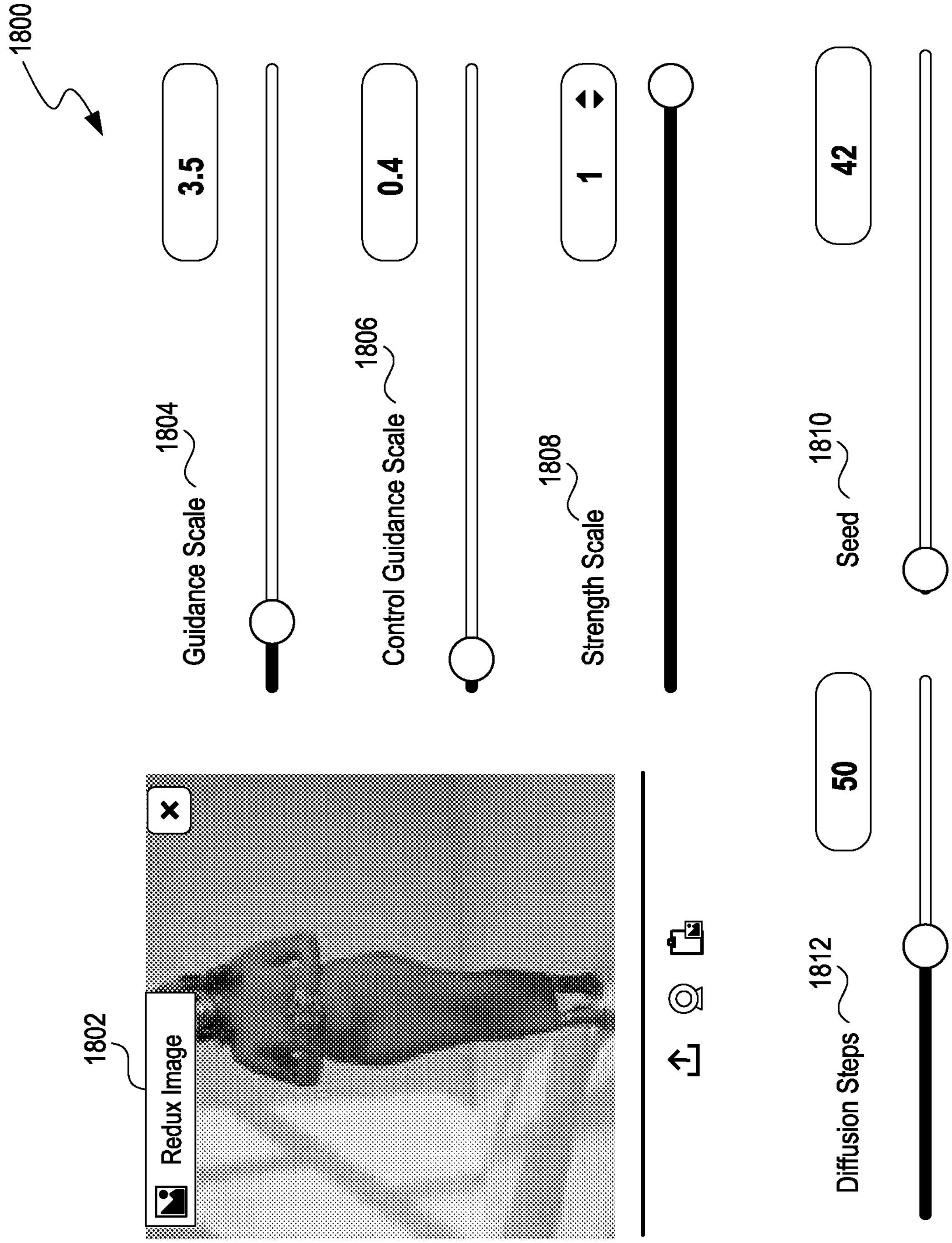
FIG. 18 is a screenshot illustrating an example user interface of a media generation platform displaying a set of parameters of a media generation platform, in accordance with some implementations of the technology.

FIG. 18 is a screenshot illustrating an example user interface 1800 of the media generation platform 110 displaying a set of parameters of the media generation platform 110, in accordance with some implementations of the technology. The user interface 1800 includes a redux image 1802, a guidance scale 1804, a control guidance scale 1806, a strength scale 1808, a seed 1810, and a diffusion step selector 1812. The user interface 1800 can be implemented using components of example computer system 2100 illustrated and described in more detail with reference to FIG. 21. Implementations of the example user interface 1800 can include different and/or additional components or can be connected in different ways.

The redux image 1802 refers to a target image that guides the transformation of the initial generated image. The redux image 1802 can represent various desired attributes, such as a specific user's appearance, a particular outfit, a distinct background, a specific photography style, and so forth. The media generation platform is enabled to use this redux image as a reference point (e.g., conditioning signal) to refine and adjust the pre-transformed image (e.g., a user-generated image). For example, during the iterative refinement of the initial generated image, an AI model (e.g., the models discussed with reference to FIGS. 1-3, 6, and 19) continuously compares the current output to the encoded redux image. The AI model can adjust features such as color palette, lighting conditions, pose, and style elements to align more closely (e.g., closer pixel similarity) with the target.

The user is enabled to adjust one or more parameters used by the media generation platform 110 (e.g., additional context) to generate the redux image 1802. For example, the user is enabled to select a particular degree of guidance on the guidance scale 1804. Guidance is a parameter that directs how closely the generated image adheres to the given textual description or prompt. In another example, the user is enabled to select a particular degree of control guidance on the control guidance scale 1806. Control guidance provides a threshold that directs a degree of visual adherence to the pose. The user is enabled to, in some implementations, adjust a strength of the redux image 1802 using the strength scale 1808. Strength refers to a degree of intensity of the applied modifications or the overall impact of the generation process on the original image. Additionally, the user is enabled to, in some implementations, adjust the seed 1810, which is a numerical value used to initialize the random number generator within the AI model to ensure reproducibility of results. In some implementations, the user is enabled to adjust a number of diffusion steps using diffusion step selector 1812, which controls the number of iterations in the diffusion process of the media generation platform 110.

Example Methods of Using the Media Generation Platform

Figure 19:
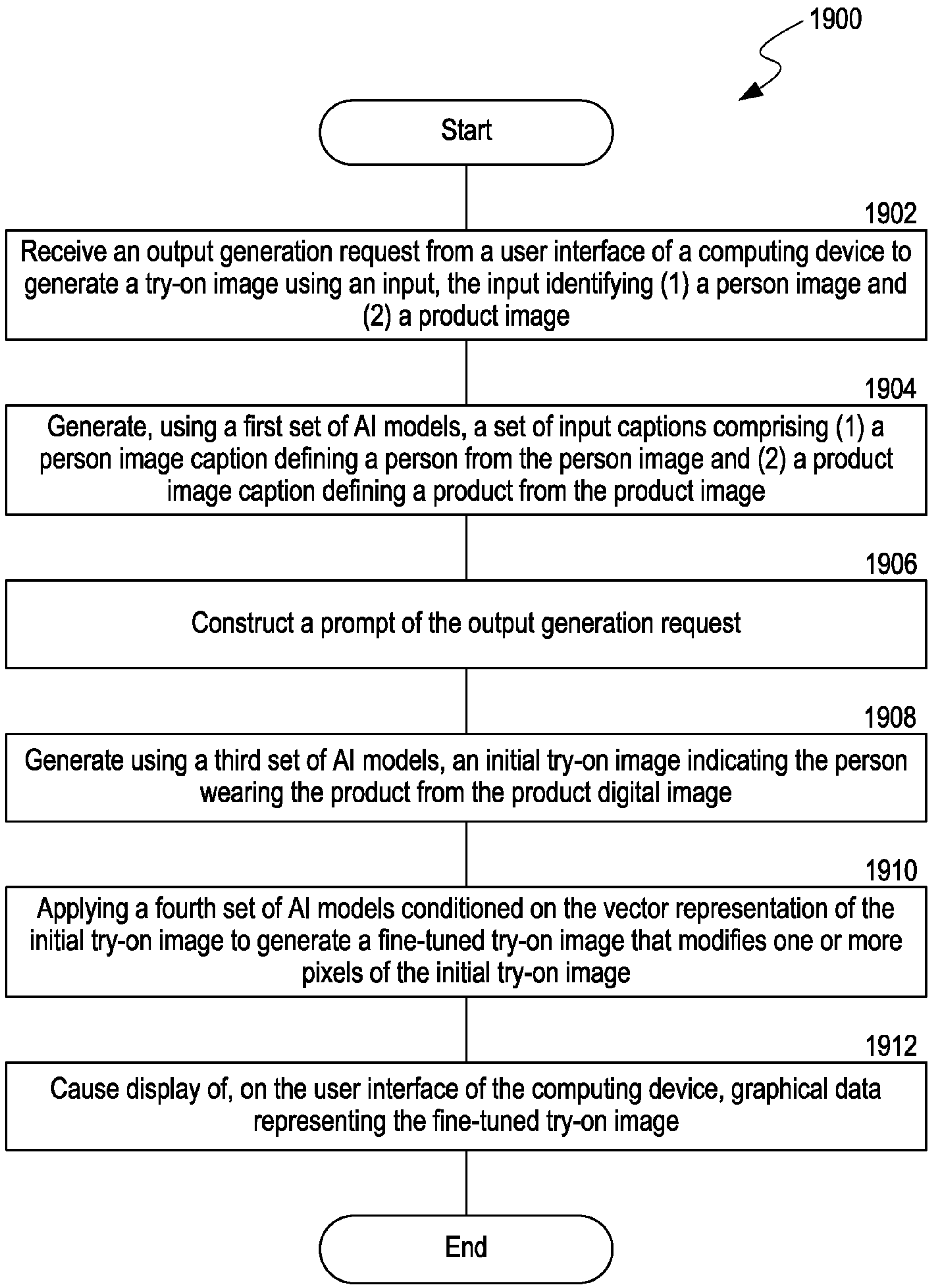
FIG. 19 is a flow diagram illustrating a process of dynamically generating customized try-on digital media representing embedded product information using AI models, in accordance with some implementations of the technology.

FIG. 19 is a flow diagram illustrating a process 1900 of dynamically generating customized try-on digital media representing embedded product information using AI models, in accordance with some implementations of the technology. In some implementations, the example process 1900 is performed by a system (e.g., the media generation platform 110) including components of the example computing environment 2100 illustrated and described in more detail with reference to FIG. 21. The system can be implemented on a terminal device, on a server, or on a telecommunications network core. Likewise, implementations can include different and/or additional operations or can perform the operations in different orders.

In operation 1902, the media generation platform 110 receives an output generation request from a user interface of a computing device to generate a try-on image using an input, the input identifying a person image and a product image. The user interface, which can be implemented using web technologies such as HTML5, CSS3, and/or JavaScript frameworks such as React or Angular, is enabled to transmit a request to an API endpoint of the media generation platform 110. The request can include metadata associated with the person and/or product images (e.g., attached files, URLs). The media generation platform 110 can pre-process images included in the output generation request by, for example, resizing image(s) to a standard resolution (e.g., 512×512 pixels) and/or converting image(s) to a consistent color space (e.g., RGB). Methods of pre-processing the images are discussed in further detail with reference to FIG. 10 and FIG. 11.

In operation 1904, the media generation platform 110 generates, using a first set of AI models, a set of input descriptions that can include a person image description defining a person from the person image and/or a product image description defining a product from the product image. For example, the media generation platform 110 passes the preprocessed images through the convolutional layers of the one or more models of the second set of AI models to extract high-dimensional feature vectors. The feature vectors can be fed into transformer-based language models that have been trained on image-text pairs. The transformer-based language models can generate natural language descriptions of the images that indicate attributes such as pose, body shape, facial features, and/or clothing details for the person image, and style, color, texture, and/or design elements for the product image. In some implementations, the media generation platform 110 generates multiple candidate descriptions, which are then ranked based on a set of predefined criteria (e.g., length, number of features).

In operation 1906, the media generation platform 110 constructs a prompt of the output generation request mapping, using a second set of AI models, the person image description and the product image into a vector space to generate a person vector representation and a product vector representation. To align the textual and visual representations in a shared vector space, the media generation platform 110 can train a multi-head attention layer to map the text embeddings and image features. The resulting aligned representations can be concatenated and passed through a series of fully connected layers with non-linear activations (e.g., ReLU) to produce the final person vector representation and product vector representation. In some implementations, the media generation platform 110 uses a learnable prompt template, implemented as a sequence of trainable embedding vectors. The learnable prompt template can be combined with the person and product representations to enable the media generation platform 110 to inject task-specific guidance into the prompt.

In operation 1908, the media generation platform 110 can generate, using a third set of AI models (e.g., a latent diffusion model), an initial try-on image indicating the person wearing the product from the product digital image. For example, the media generation platform 110 can generate a vector representation of a noisy image by applying a noise value to the prompt that determines an unmodified portion of the initial try-on image. The noise value can be sampled from a normal distribution with mean 0 and variance 1, using a random number generator seeded for reproducibility. The media generation platform 110 can iteratively (e.g., 50 to 1100 steps) denoising the vector representation of the noisy image in accordance with the constructed prompt to generate a vector representation of the initial try-on image. Each step can progressively denoising the latent representation. The initial try-on image can depict the person from the person digital image with one or more pixels of the person digital image replaced by the product digital image. Methods of generating the initial try-on image are discussed in further detail with reference to FIGS. 1-6.

In some implementations, generating the initial augmented image includes encoding the person image into a latent representation using an encoder model structured to compress visual information of the person image into a vector or tensor. The encoder model can pass the person image through one or more convolutional layers to extract features such as edges, textures, object shapes, and scene composition. The media generation platform 110 can modify the latent representation based on the product image by combining the latent representation with product-specific features extracted from the product image. The modified latent representation can be decoded into the initial augmented image using a decoder model structured to convert the latent representation into one or more pixels within the initial augmented image. The decoder model can be implemented using a series of transposed convolutions or upsampling layers that progressively increase the spatial resolution of the image while decreasing its channel depth.

In some implementations, the third set of AI models includes a first neural network (or other model) and a second neural network (or other model) that are selectively activated based on a noise level of the vector representation during the iterative denoising process. The first neural network can be structured or trained to partially denoise the vector representation of the noisy image during a first portion of the iterative denoising when the noise level of the vector representation exceeds a threshold. The second neural network can be structured or trained to partially denoise the vector representation of the noisy image during a second portion of the iterative denoising when the noise level of the vector representation is below the threshold. For example, the first neural network can be activated in high-noise scenarios and the second neural network can be activated in low-noise scenarios to refine details in the generated image.

In some implementations, the person image is a frame within a plurality of frames that represent a video. The media generation platform 110 can generate the fine-tuned augmented image for the frame and modify one or more other frames within the plurality of frames based on the fine-tuned augmented image. For example, the media generation platform 110 can select a subset of the plurality of frames as keyframes and generate fine-tuned augmented images for the keyframes using the first, second, third, and/or fourth sets of AI models. The media generation platform 110 can generate edited versions of intermediate frames (i.e., frames between the keyframes) based on the fine-tuned augmented images of the keyframes. This approach enables the media generation platform 110 to reduce computational requirements while maintaining visual consistency across the video.

In some implementations, generating edited versions of intermediate frames includes encoding the fine-tuned augmented images of the keyframes into keyframe latent representations using an encoder. The media generation platform 110 can generate intermediate latent representations for the intermediate frames based on the keyframe latent representations. For example, the media generation platform 110 can estimate how the user moves between frames using motion tracking (e.g., optical flow, feature tracking, or correspondence maps) to determine the displacement of pixels from one frame to the next. Based on the estimated motion, the media generation platform 110 can warp the keyframe latent representation by shifting the values within the latent tensor according to the motion vectors to generate the intermediate latent representations, such that the edited garment or product follows the user's body movement. The media generation platform 110 can decode the keyframe latent representations and the intermediate latent representations into displayable frames using a decoder.

Performing propagation in latent space rather than pixel space can reduce memory bandwidth and reduce visible flicker relative to repeated pixel-space transformations because the latent representations are smaller in size than the full-resolution pixel images and contain smoother, more abstract features that are less susceptible to high-frequency artifacts. The media generation platform 110 can reduce a number of iterations used in the iterative denoising to achieve lower latency for real-time or near real-time operation. For example, the media generation platform 110 can use a distilled model that has been trained to approximate the output of a larger model using fewer denoising steps, or can reuse cached conditioning signals (e.g., text embeddings, reference image embeddings) across multiple frames rather than redetermining them for each frame.

In some implementations, the media generation platform 110 is implemented as a streaming asynchronous pipeline for processing live or near-live video content. The streaming asynchronous pipeline can include a first component (e.g., a decode thread or process) structured to receive frames from a video source such as a camera or network stream. The streaming asynchronous pipeline can further include a second component (e.g., an edit worker) structured to perform inference using the third set of AI models on a graphics processing unit. The streaming asynchronous pipeline can include a third component (e.g., a render thread) structured to composite and/or output edited frames for display. The first component, the second component, and the third component can operate asynchronously and communicate through one or more of ring buffers, queues, shared memory, and so forth. Multiple frames can be batched when system conditions permit, while latency-sensitive display scheduling can prioritize output cadence over maximum batch size.

In some implementations, the media generation platform 110 performs region-of-interest editing rather than re-editing the full frame uniformly. A segmentation model, parser, tracker, pose model, or garment-localization model can identify a clothing region, accessory region, or other target area within the frame. The third set of AI models or the fourth set of AI models can preferentially allocate computation to those identified regions. This approach reduces latency and helps preserve unedited portions of the frame, thereby improving efficiency and visual consistency.

The media generation platform 110 can prevent shimmer, drift, or flicker when processing video content by caching attention values (e.g., key and value tensors from the transformer attention layers) determined for a previous frame and reuse those cached values when processing the current frame, so that the model attends to similar regions across frames and produces consistent outputs. In some implementations, the media generation platform 110 can blend the edited latent representation of the current frame with a warped version of the edited latent representation from the previous frame, such that the warping is performed according to the estimated motion between frames, so that the edited garment or product maintains a consistent appearance over time. In another example, the media generation platform 110 can compare a confidence score of the current-frame edit (e.g., based on a reconstruction loss or attention entropy) against a threshold, and if the confidence score is below the threshold, the media generation platform 110 can fall back to displaying a warped version of the previous stable output rather than displaying the uncertain current-frame edit.

In operation 1910, the media generation platform 110 applies a fourth set of AI models conditioned on the vector representation of the initial try-on image to generate a fine-tuned try-on image that modifies one or more pixels of the initial try-on image in accordance with a complexion of the person, a face shape of the person, a body shape of the person, a pose of the person, a set of camera parameters of a camera capturing the person image, and so forth. For complexion adjustment, the environment 600 in FIG. 6 can be used to modify skin color while preserving texture details using the user's input prompt (e.g., prompt 202 in FIG. 6) and the user image as the redux image. In some implementations, the media generation platform 110 estimates three-dimensional face parameters from the initial image and used to match the face shape of the try-on image. In some implementations, the media generation platform 110 adjusts a body shape, a pose, a camera parameter, and so forth using the fourth set of AI models. Examples of the fourth set of AI models and methods of using the fourth set of AI models are discussed in further detail with reference to FIGS. 1-18. In some implementations, the refinement models are applied in a cascaded manner, with each stage conditioned on the output of the previous one.

In operation 1912, the media generation platform 110 causes display of, on the user interface of the computing device, graphical data representing the fine-tuned try-on image. The media generation platform 110 can construct JSON response including the encoded image data along with metadata such as image dimensions and format to be transmitted to the user interface. In some implementations, the media generation platform 110 progressively loads the graphical data by initially displaying a lower-resolution placeholder image, followed by progressively increasing the image quality (e.g., higher fidelity by replacing the placeholder image) as more data is received.

Example Implementation of the Models of the Media Generation Platform

Figure 20:
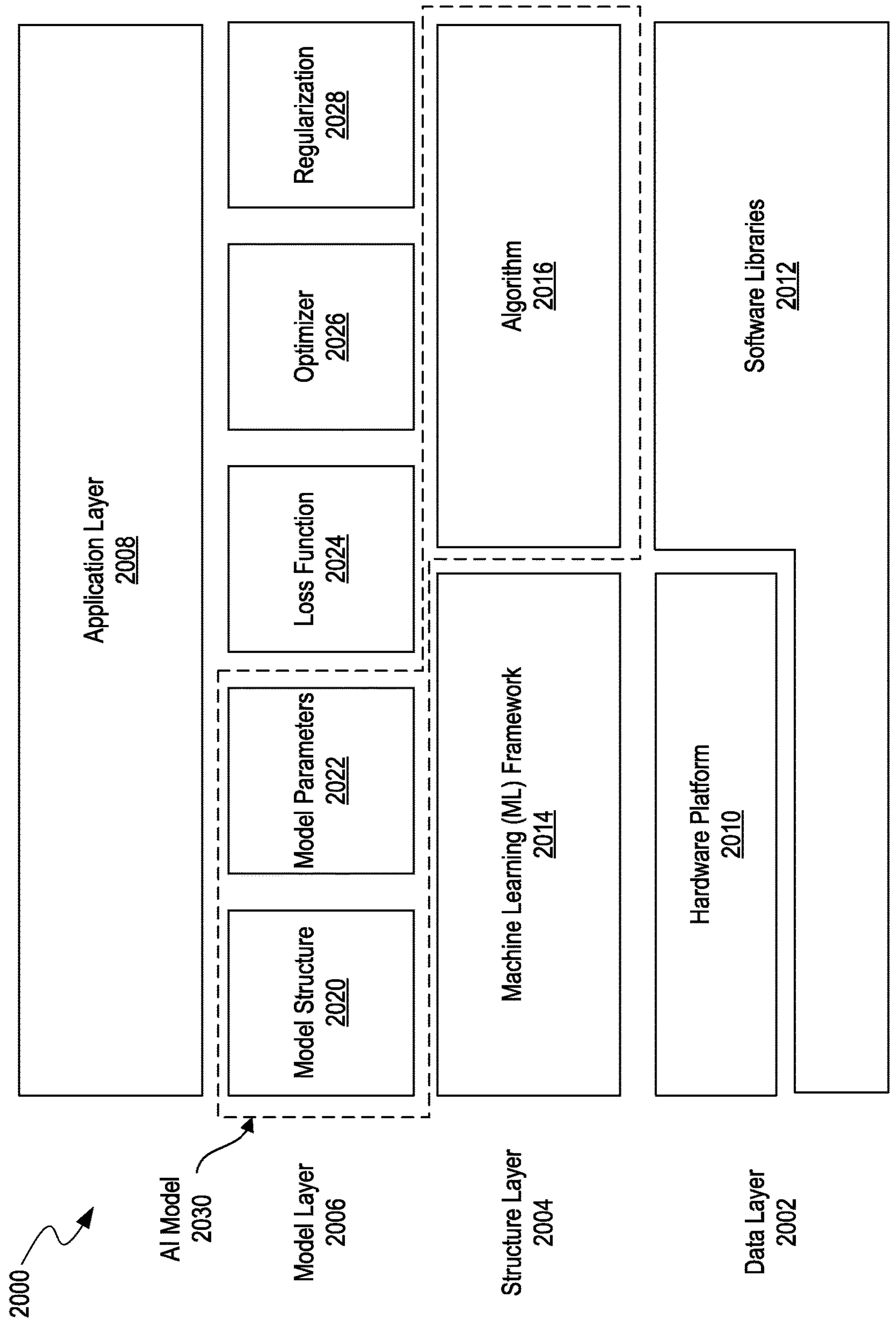
FIG. 20 illustrates a layered architecture of an AI system that can implement the machine learning (ML) models of a media generation platform, in accordance with some implementations of the present technology.

FIG. 20 illustrates a layered architecture of an AI system 2000 that can implement the ML models of the media generation platform 110 of FIG. 1, in accordance with some implementations of the present technology. Example ML models can include the models executed by the media generation platform 110, such as the diffusion model 124 and fine-tuning models 128 in FIG. 1. Accordingly, the models of the media generation platform 110 can include one or more components of the AI system 2000.

As shown, the AI system 2000 can include a set of layers, which conceptually organize elements within an example network topology for the AI system's architecture to implement a particular AI model. Generally, an AI model is a computer-executable program implemented by the AI system 2000 that analyzes data to make predictions. Information can pass through each layer of the AI system 2000 to generate outputs for the AI model. The layers can include a data layer 2002, a structure layer 2004, a model layer 2006, and an application layer 2008. The algorithm 2016 of the structure layer 2004 and the model structure 2020 and model parameters 2022 of the model layer 2006 together form an example AI model. The loss function engine 2024, optimizer 2026, and regularization engine 2028 work to refine and optimize the AI model, and the data layer 2002 provides resources and support for application of the AI model by the application layer 2008.

The data layer 2002 acts as the foundation of the AI system 2000 by preparing data for the AI model. As shown, the data layer 2002 can include two sub-layers: a hardware platform 2010 and one or more software libraries 2012. The hardware platform 2010 can be designed to perform operations for the AI model and include computing resources for storage, memory, logic, and networking, such as the resources described in relation to FIGS. 21 and 10. The hardware platform 2010 can process amounts of data using one or more servers. The servers can perform backend operations such as matrix calculations, parallel calculations, ML training, and the like. Examples of servers used by the hardware platform 2010 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 2010 can include computing resources, (e.g., servers, memory, etc.) offered by a cloud services provider. The hardware platform 2010 can also include computer memory for storing data about the AI model, application of the AI model, and training data for the AI model. The computer memory can be a form of random-access memory (RAM), such as dynamic RAM, static RAM, and non-volatile RAM.

The software libraries 2012 can be thought of as suites of data and programming code, including executables, used to control the computing resources of the hardware platform 2010. The programming code can include low-level primitives (e.g., fundamental language elements) that form the foundation of one or more low-level programming languages, such that servers of the hardware platform 2010 can use the low-level primitives to carry out specific operations. The low-level programming languages do not require much, if any, abstraction from a computing resource's instruction set architecture, enabling them to run quickly with a small memory footprint. Examples of software libraries 2012 that can be included in the AI system 2000 include INTEL Math Kernel Library, NVIDIA cuDNN, EIGEN, and OpenBLAS.

The structure layer 2004 can include an ML framework 2014 and an algorithm 2016. The ML framework 2014 can be thought of as an interface, library, or tool that enables users to build and deploy the AI model. The ML framework 2014 can include an open-source library, an API, a gradient-boosting library, an ensemble method, and/or a deep learning toolkit that work with the layers of the AI system to facilitate development of the AI model. For example, the ML framework 2014 can distribute processes for application or training of the AI model across multiple resources in the hardware platform 2010. The ML framework 2014 can also include a set of pre-built components that have the functionality to implement and train the AI model and enable users to use pre-built functions and classes to construct and train the AI model. Thus, the ML framework 2014 can be used to facilitate data engineering, development, hyperparameter tuning, testing, and training for the AI model. Examples of ML frameworks 2014 that can be used in the AI system 2000 include TENSORFLOW, PYTORCH, SCIKIT-LEARN, KERAS, LightGBM, RANDOM FOREST, and AMAZON WEB SERVICES.

The algorithm 2016 can be an organized set of computer-executable operations used to generate output data from a set of input data and can be described using pseudocode. The algorithm 2016 can include complex code that enables the computing resources to learn from new input data and create new/modified outputs based on what was learned. In some implementations, the algorithm 2016 can build the AI model through being trained while running computing resources of the hardware platform 2010. This training enables the algorithm 2016 to make predictions or decisions without being explicitly programmed to do so. Once trained, the algorithm 2016 can run at the computing resources as part of the AI model to make predictions or decisions, improve computing resource performance, or perform tasks. The algorithm 2016 can be trained using supervised learning, unsupervised learning, semi-supervised learning, and/or reinforcement learning.

Using supervised learning, the algorithm 2016 can be trained to learn patterns (e.g., map input data to output data) based on labeled training data. The training data may be labeled by an external user or operator. For instance, a user may collect a set of training data, such as by capturing data from sensors, images from a camera, outputs from a model (e.g., an AI model), and the like. In an example implementation, training data can include native-format data collected (e.g., in the form of image prompt 102 in FIG. 1) from various source computing systems described in relation to FIG. 1. Furthermore, training data can include pre-processed data generated by various engines of the media generation platform 110 described in relation to FIG. 1. The user may label the training data based on one or more classes and trains the AI model by inputting the training data to the algorithm 2016. The algorithm 2016 determines how to label the new data based on the labeled training data. The user can facilitate collection, labeling, and/or input via the ML framework 2014. In some instances, the user may convert the training data to a set of feature vectors for input to the algorithm 2016. Once trained, the user can test the algorithm 2016 on new data to determine whether the algorithm 2016 is predicting accurate labels for the new data. For example, the user can use cross-validation methods to test the accuracy of the algorithm 2016 and retrain the algorithm 2016 on new training data if the results of the cross-validation are below an accuracy threshold.

Supervised learning can include classification and/or regression. Classification techniques include teaching the algorithm 2016 to identify a category of new observations based on training data and are used when input data for the algorithm 2016 is discrete. Said differently, when learning through classification techniques, the algorithm 2016 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 2016 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 2016 is continuous. Regression techniques can be used to train the algorithm 2016 to predict or forecast relationships between variables. To train the algorithm 2016 using regression techniques, a user can select a regression method for estimating the parameters of the model. The user collects and labels training data that is input to the algorithm 2016 such that the algorithm 2016 is trained to understand the relationship between data features and the dependent variable(s). Once trained, the algorithm 2016 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill in missing data for machine learning-based pre-processing operations.

Under unsupervised learning, the algorithm 2016 learns patterns from unlabeled training data. In particular, the algorithm 2016 is trained to learn hidden patterns and insights of input data, which can be used for data exploration or for generating new data. Here, the algorithm 2016 does not have a predefined output, unlike the labels output when the algorithm 2016 is trained using supervised learning. Said another way, unsupervised learning is used to train the algorithm 2016 to find an underlying structure of a set of data, group the data according to similarities, and represent that set of data in a compressed format. The media generation platform 110 can use unsupervised learning to identify patterns in claim history (e.g., to identify particular event sequences) and so forth. In some implementations, performance of the models of the media generation platform 110 that can use unsupervised learning is improved because the incoming prompt 102 are pre-processed and reduced, based on the relevant triggers, as described herein.

A few techniques can be used in supervised learning: clustering, anomaly detection, and techniques for learning latent variable models. Clustering techniques include grouping data into different clusters that include similar data, such that other clusters contain dissimilar data. For example, during clustering, data with possible similarities remain in a group that has fewer or no similarities to another group. Examples of clustering techniques include density-based methods, hierarchical-based methods, partitioning methods, and grid-based methods. In one example, the algorithm 2016 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 2016 may be trained to be an Isolation Forest, local outlier factor (LOF) algorithm, or k-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 2016 include factor analysis, item response theory, latent profile analysis, and latent class analysis.

The model layer 2006 implements the AI model using data from the data layer 2002 and the algorithm 2016 and ML framework 2014 from the structure layer 2004, thus enabling decision-making capabilities of the AI system 2000. The model layer 2006 includes a model structure 2020, model parameters 2022, a loss function engine 2024, an optimizer 2026, and a regularization engine 2028.

The model structure 2020 describes the architecture of the AI model of the AI system 2000. The model structure 2020 defines the complexity of the pattern/relationship that the AI model expresses. Examples of structures that can be used as the model structure 2020 include decision trees, support vector machines, regression analyses, Bayesian networks, Gaussian processes, genetic algorithms, and artificial neural networks (or, simply, neural networks). The model structure 2020 can include a number of structure layers, a number of nodes (or neurons) at each structure layer, and activation functions of each node. Each node's activation function defines how the node converts data received to data output. The structure layers may include an input layer of nodes that receive input data and an output layer of nodes that produce output data. The model structure 2020 may include one or more hidden layers of nodes between the input and output layers. The model structure 2020 can be an artificial neural network (or, simply, neural network) that connects the nodes in the structured layers such that the nodes are interconnected. Examples of neural networks include feedforward neural networks, CNNs, recurrent neural networks (RNNs), autoencoder, and generative adversarial networks (GANs).

The model parameters 2022 represent the relationships learned during training and can be used to make predictions and decisions based on input data. The model parameters 2022 can weight and bias the nodes and connections of the model structure 2020. For instance, when the model structure 2020 is a neural network, the model parameters 2022 can weight and bias the nodes in each layer of the neural networks, such that the weights determine the strength of the nodes and the biases determine the thresholds for the activation functions of each node. The model parameters 2022, in conjunction with the activation functions of the nodes, determine how input data is transformed into desired outputs. The model parameters 2022 can be determined and/or altered during training of the algorithm 2016.

The loss function engine 2024 can determine a loss function, which is a metric used to evaluate the AI model's performance during training. For instance, the loss function engine 2024 can measure the difference between a predicted output of the AI model and the actual output of the AI model and is used to guide optimization of the AI model during training to minimize the loss function. The loss function may be presented via the ML framework 2014, such that a user can determine whether to retrain or otherwise alter the algorithm 2016 if the loss function is over a threshold. In some instances, the algorithm 2016 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cos h loss function, and quantile loss function.

The optimizer 2026 adjusts the model parameters 2022 to minimize the loss function during training of the algorithm 2016. In other words, the optimizer 2026 uses the loss function generated by the loss function engine 2024 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF), and Limited-memory BFGS (L-BFGS). The type of optimizer 2026 used may be determined based on the type of model structure 2020 and the size of data and the computing resources available in the data layer 2002.

The regularization engine 2028 executes regularization operations. Regularization is a technique that prevents over- and underfitting of the AI model. Overfitting occurs when the algorithm 2016 is overly complex and too adapted to the training data, which can result in poor performance of the AI model. Underfitting occurs when the algorithm 2016 is unable to recognize even basic patterns from the training data such that it cannot perform well on training data or on validation data. The optimizer 2026 can apply one or more regularization techniques to fit the algorithm 2016 to the training data properly, which helps constrain the resulting AI model and improves its ability for generalized application. Examples of regularization techniques include lasso (L1) regularization, ridge (L2) regularization, and elastic (L1 and L2) regularization.

The application layer 2008 describes how the AI system 2000 is used to solve problems or perform tasks. In an example implementation, the application layer 2008 can include a front-end user interface of the media generation platform 110.

Example Computing Environment of the Media Generation Platform

Figure 21:
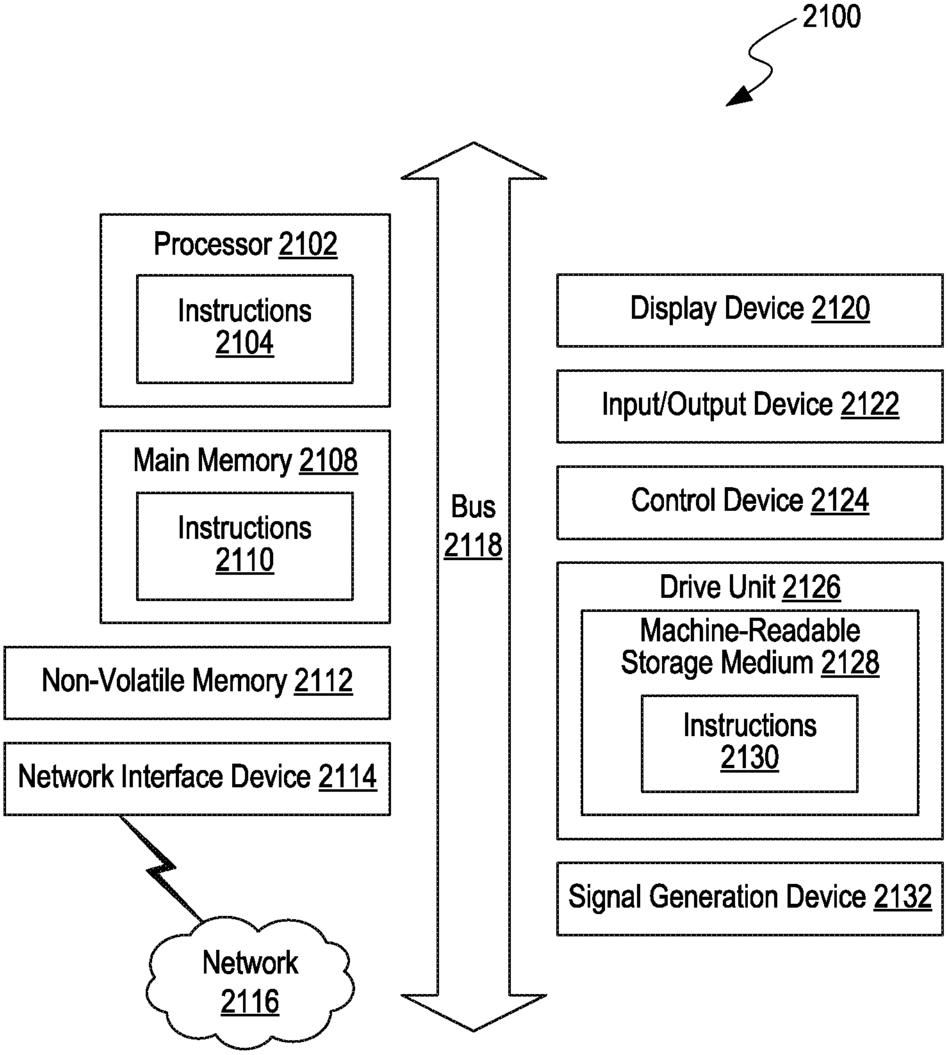
FIG. 21 is a block diagram showing some of the components typically incorporated in at least some of the computer systems and other devices on which a media generation platform operates in accordance with some implementations of the present technology.

FIG. 21 is a block diagram showing some of the components typically incorporated in at least some of the computer systems 2100 and other devices on which the disclosed system operates in accordance with some implementations of the present technology. As shown, an example computer system 2100 can include: one or more processors 2102, main memory 2108, non-volatile memory 2112, a network interface device 2114, a video display device 2120, an input/output device 2122, a control device 2124 (e.g., keyboard and pointing device), a drive unit 2126 that includes a machine-readable medium 2128, and a signal generation device 2132 that are communicatively connected to a bus 2118. The bus 2118 represents one or more physical buses and/or point-to-point connections that are connected by appropriate bridges, adapters, or controllers. Various common components (e.g., cache memory) are omitted from FIG. 21 for brevity. Instead, the computer system 2100 is intended to illustrate a hardware device on which components illustrated or described relative to the examples of the figures and any other components described in this specification can be implemented.

The computer system 2100 can take any suitable physical form. For example, the computer system 2100 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 2100. In some implementations, the computer system 2100 can be an embedded computer system, a system-on-chip (SOC), a single-board computer system (SBC) or a distributed system such as a mesh of computer systems or can include one or more cloud components in one or more networks. Where appropriate, one or more computer systems 2100 can perform operations in real time, in near real time, or in batch mode.

The network interface device 2114 enables the computer system 2100 to exchange data in a network 2116 with an entity that is external to the computer system 2100 through any communication protocol supported by the computer system 2100 and the external entity. Examples of the network interface device 2114 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 2108, non-volatile memory 2112, machine-readable medium 2128) can be local, remote, or distributed. Although shown as a single medium, the machine-readable medium 2128 can include multiple media (e.g., a centralized/distributed database and/or associated caches and servers) that store one or more sets of instructions 2104, 2130. The machine-readable (storage) medium 2128 can include any medium that is capable of storing, encoding, or carrying a set of instructions for execution by the computer system 2100. The machine-readable medium 2128 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 2110, 2130) set at various times in various memory and storage devices in computing device(s). When read and executed by the processor 2102, the instruction(s) cause the computer system 2100 to perform operations to execute elements involving the various aspects of the disclosure.

Figure 22:
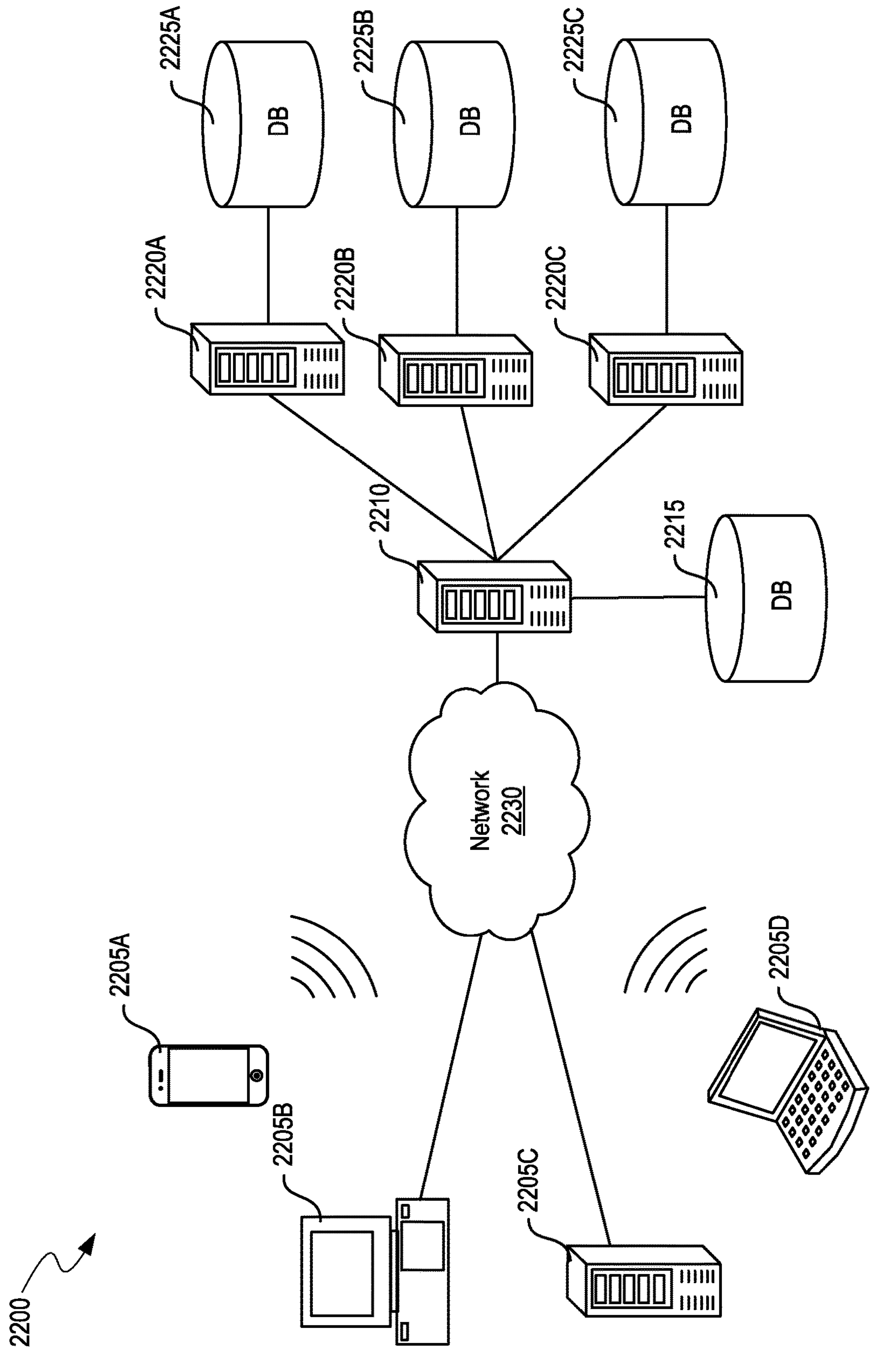
FIG. 22 is a system diagram illustrating an example of a computing environment in which a media generation platform operates in some implementations of the present technology.

FIG. 22 is a system diagram illustrating an example of a computing environment 2200 in which the disclosed system operates in some implementations. In some implementations, the computing environment 2200 includes one or more client computing devices 2205A-D, examples of which can host the media generation platform 110 of FIG. 1. Client computing devices 2205 operate in a networked environment using logical connections through network 2230 to one or more remote computers, such as a server computing device.

In some implementations, server 2210 (e.g., server computing device) is an edge server that receives client requests and coordinates fulfillment of those requests through other servers, such as servers 2220A-C. In some implementations, server computing devices 2210 and 2220 comprise computing systems, such as the media generation platform 110 of FIG. 1. Though each server computing device 2210 and 2220 is displayed logically as a single server, each server computing device can be a distributed computing environment encompassing multiple computing devices located at the same or at geographically disparate physical locations. In some implementations, each server 2220 corresponds to a group of servers.

Client computing devices 2205 and server computing devices 2210 and 2220 can each act as a server or client to other server or client devices. In some implementations, servers (2210, 2220A-C) connect to a corresponding database (2215, 2225A-C). As discussed above, each server 2220 can correspond to a group of servers, and each of these servers can share a database or can have its own database. Databases 2215 and 2225 warehouse (e.g., store) information such as claims data, email data, call transcripts, call logs, policy data, and so on. Though databases 2215 and 2225 are displayed logically as single units, databases 2215 and 2225 can each be a distributed computing environment encompassing multiple computing devices, can be located within their corresponding server, or can be located at the same or at geographically disparate physical locations.

Network 2230 can be a local area network (LAN) or a wide area network (WAN) but can also be other wired or wireless networks. In some implementations, network 2230 is the Internet or some other public or private network. Client computing devices 2205 are connected to network 2230 through a network interface, such as by wired or wireless communication. While the connections between server 2210 and servers 2220 are shown as separate connections, these connections can be any kind of local, wide area, wired, or wireless network, including network 2230 or a separate public or private network.

ADDITIONAL EXAMPLES

The following examples are illustrative of several implementations of the present technology:

1. A computer-implemented method for dynamically generating augmented digital media representing embedded product data using artificial intelligence (AI), the method comprising:

receiving an output generation request from a user interface of a computing device to generate an augmented image using an input, the input identifying (1) a person image and (2) a product image;

generating, using a first set of AI models, a set of input captions comprising (1) a person image caption defining a person from the person image and (2) a product image caption defining a product from the product image;

constructing a prompt of the output generation request by mapping, using a second set of AI models, (1) the person image caption and (2) the product image into a vector space to generate (1) a person vector representation and (2) a product vector representation;

generating, using a third set of AI models, an initial augmented image indicating the person wearing the product from the product image by:

generating a vector representation of a noisy image by applying a noise value to the person vector representation, wherein the noise value is indicative of an unmodified portion of the initial augmented image, and iteratively denoising the vector representation of the noisy image in accordance with the constructed prompt to generate a vector representation of the initial augmented image, wherein the initial augmented image depicts the person from the person image with one or more pixels of the person image replaced by the product image; and applying a fourth set of AI models conditioned on the vector representation of the initial augmented image to generate a fine-tuned augmented image that modifies one or more pixels of the initial augmented image in accordance with at least one of: (1) a complexion of the person, (2) a face shape of the person, (3) a body shape of the person, (4) a pose of the person, or (5) a set of camera parameters of a camera capturing the person image; and causing display of, on the user interface of the computing device, graphical data representing the fine-tuned augmented image.

2. The method of example 1, wherein constructing the prompt further comprises:

concatenating the person vector representation with a latent context representation to generate a concatenated latent prompt representation.

3. The method of example 1, wherein the input further comprises additional context information associated with the person, and wherein the additional context information comprises at least one of: skin tone, body size, hair style, hair color, or age of the person.

4. The method of example 1, wherein applying the fourth set of AI models comprises:

generating an input image mask to selectively indicate one or more pixels of the initial augmented image to modify, wherein the input image mask covers at least one of: a face portion, a hand portion, or a leg portion of the person in the initial augmented image.

5. The method of example 1, further comprising:

extracting a set of pose controls from the person image, wherein the set of pose controls comprises a skeletal outline representing a set of anatomical points or body segments of the person.

6. The method of example 1, wherein generating the initial augmented image comprises:

encoding the person image into a latent representation using an encoder model configured to compress visual information of the person image;

modifying the latent representation based on the product image; and decoding the modified latent representation into the initial augmented image using a decoder model configured to convert the latent representation into one or more pixels within the initial augmented image.

7. The method of claim 1, The method of claim 1, wherein the third set of AI models comprises a latent diffusion model.

8. The method of claim 1, wherein the first set of AI models includes at least one of a Contrastive Language-Image Pre-training (CLIP) model or a Text-To-Text Transfer Transformer (T5) model.

9. The method of example 1, wherein the third set of AI models comprises:

a first neural network configured to partially denoise the vector representation of the noisy image during a first portion of the iterative denoising when a noise level of the vector representation exceeds a threshold; and a second neural network configured to partially denoise the vector representation of the noisy image during a second portion of the iterative denoising when the noise level of the vector representation is below the threshold.

10. A non-transitory, computer-readable storage medium storing instructions for dynamically generating augmented digital media representing embedded product data using artificial intelligence (AI) models, wherein the instructions when executed by at least one data processor of a system, cause the system to:

receive an output generation request from a user interface of a computing device to generate an augmented image using an input, the input identifying (1) a person image and (2) a product image;

generate, using a first set of AI models, a set of input descriptions comprising (1) a person image description defining a person from the person image and (2) a product image description defining a product from the product image;

construct a prompt of the output generation request by mapping, using a second set of AI models, (1) the person image description and (2) the product image into a vector space to generate (1) a person vector representation and (2) a product vector representation;

generate, using a third set of AI models, an initial augmented image indicating the person wearing the product from the product image by:

generating a vector representation of a noisy image by applying a noise value to the person vector representation, wherein the noise value is indicative of an unmodified portion of the initial augmented image, and iteratively denoising the vector representation of the noisy image in accordance with the constructed prompt to generate a vector representation of the initial augmented image, wherein the initial augmented image depicts the person from the person image with one or more pixels of the person image replaced by the product image; and apply a fourth set of AI models conditioned on the vector representation of the initial augmented image to generate a fine-tuned augmented image that modifies one or more pixels of the initial augmented image in accordance with at least one of: (1) a complexion of the person, (2) a face shape of the person, (3) a body shape of the person, (4) a pose of the person, or (5) a set of camera parameters of a camera capturing the person image; and cause display of, on the user interface of the computing device, graphical data representing the fine-tuned augmented image.

11. The non-transitory, computer-readable storage medium of example 10, wherein one or more of the first, second, third, or fourth set of AI models are different.

12. The non-transitory, computer-readable storage medium of example 10, wherein the system is further caused to:

receive a user input to adjust at least one parameter used to generate the fine-tuned augmented image, wherein the at least one parameter includes at least one of: a guidance scale, a control guidance scale, a strength scale, a seed value, or a number of diffusion steps.

13. The non-transitory, computer-readable storage medium of example 10, wherein causing display of the graphical data representing the fine-tuned augmented image further causes the system to:

progressively loading the graphical data by:

displaying a placeholder image, and replacing the placeholder image with a new image that has a greater degree of fidelity.

14. The non-transitory, computer-readable storage medium of example 10, wherein the product image comprises a digital photograph of a specific retail item.

15. The non-transitory, computer-readable storage medium of example 10, wherein the image is a frame within a plurality of frames that represent a video, and wherein the system is further caused to:

modify one or more other frames within the plurality of frames based on the fine-tuned augmented image.

16. The non-transitory, computer-readable storage medium of example 10, wherein one or more of the first, second, third, or fourth set of AI models are the same.

14. The non-transitory, computer-readable storage medium of example 10, wherein the system is further caused to:

remove a background of one or more of the person image or the product image.

17. A system comprising:

at least one hardware processor; and at least one non-transitory memory storing instructions, which, when executed by the at least one hardware processor, cause the system to:

receive an output generation request from a user interface of a computing device to generate an augmented image using an input, the input identifying (1) a person image and (2) a product image;

generate, using a first set of AI models, a set of input descriptions comprising (1) a person image description defining a person from the person image and (2) a product image description defining a product from the product image;

construct a prompt of the output generation request by mapping, using a second set of AI models, (1) the person image description and (2) the product image into a vector space to generate (1) a person vector representation and (2) a product vector representation;

generate, using a third set of AI models, an initial augmented image indicating the person wearing the product from the product image by:

generating a vector representation of a noisy image by applying a noise value to the person vector representation, wherein the noise value is indicative of an unmodified portion of the initial augmented image, and iteratively denoising the vector representation of the noisy image in accordance with the constructed prompt to generate a vector representation of the initial augmented image, wherein the initial augmented image depicts the person from the person image with one or more pixels of the person image replaced by the product image; and apply a fourth set of AI models conditioned on the vector representation of the initial augmented image to generate a fine-tuned augmented image that modifies one or more pixels of the initial augmented image in accordance with at least one of: (1) a complexion of the person, (2) a face shape of the person, (3) a body shape of the person, (4) a pose of the person, or (5) a set of camera parameters of a camera capturing the person image; and cause display of, on the user interface of the computing device, graphical data representing the fine-tuned augmented image.

18. The system of example 17, wherein the system is further caused to:

resize one or more of the person image or the product image.

19. The system of example 17, wherein the system is further caused to:

applying a Canny filter to the person image to generate a set of edges outlining the person in the person image.

20. The system of example 17, wherein applying the fourth set of AI models further causes the system to:

use a conditional generative adversarial network (cGAN) trained on skin tone pairs to modify skin color of the initial augmented image.

21. The system of example 17, wherein the system is further caused to:

extract, using a set of convolutional layers of the first set of AI models, a set of feature vectors from the person image and the product image; and generate, a set of natural language descriptions of the person image and the product image based on the extracted feature vectors, wherein the natural language descriptions indicate at least one of pose, body shape, facial features, color, or texture.

22. The system of example 17, wherein the system is further caused to:

generate multiple candidate descriptions for the person image and the product image; and rank the candidate descriptions based on a set of predefined criteria.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right after filing this application to pursue such additional claim forms, either in this application or in a continuing application.

From the foregoing, it will be appreciated that specific implementations of the invention have been described herein for purposes of illustration but that various modifications can be made without deviating from the scope of the invention. Accordingly, the invention is not limited except as by the appended claims.

We claim:

1. A computer-implemented method for graphically altering digital media by embedding virtual objects using artificial intelligence (AI), the method comprising:

receiving an output generation request from a user interface of a computing device to generate an augmented image using an input, the input identifying (1) a person image and (2) a product image;

generating, using a first set of AI models, a set of input captions comprising (1) a person image caption defining a person from the person image and (2) a product image caption defining a product from the product image;

constructing a prompt of the output generation request by mapping, using a second set of AI models, (1) the person image caption and (2) the product image into a vector space to generate (1) a person vector representation and (2) a product vector representation;

generating, using a third set of AI models, an initial augmented image indicating the person wearing the product from the product image by:

generating a vector representation of a noisy image by applying a noise value to the person vector representation, wherein the noise value is indicative of an unmodified portion of the initial augmented image, and iteratively denoising the vector representation of the noisy image in accordance with the constructed prompt to generate a vector representation of the initial augmented image, wherein the initial augmented image depicts the person from the person image with one or more pixels of the person image replaced by the product image; and applying a fourth set of AI models conditioned on the vector representation of the initial augmented image to generate a fine-tuned augmented image that modifies one or more pixels of the initial augmented image in accordance with at least one of: (1) a complexion of the person, (2) a face shape of the person, (3) a body shape of the person, (4) a pose of the person, or (5) a set of camera parameters of a camera capturing the person image; and causing display of, on the user interface of the computing device, graphical data representing the fine-tuned augmented image.

2. The method of claim 1, wherein constructing the prompt further comprises:

concatenating the person vector representation with a latent context representation to generate a concatenated latent prompt representation.

3. The method of claim 1, wherein the input further comprises additional context information associated with the person, and wherein the additional context information comprises at least one of: skin tone, body size, hair style, hair color, or age of the person.

4. The method of claim 1, wherein applying the fourth set of AI models comprises:

generating an input image mask to selectively indicate one or more pixels of the initial augmented image to modify, wherein the input image mask covers at least one of: a face portion, a hand portion, or a leg portion of the person in the initial augmented image.

5. The method of claim 1, further comprising:

extracting a set of pose controls from the person image, wherein the set of pose controls comprises a skeletal outline representing a set of anatomical points or body segments of the person.

6. The method of claim 1, wherein generating the initial augmented image comprises:

encoding the person image into a latent representation using an encoder model configured to compress visual information of the person image;

modifying the latent representation based on the product image; and decoding the modified latent representation into the initial augmented image using a decoder model configured to convert the latent representation into one or more pixels within the initial augmented image.

7. The method of claim 1, wherein the third set of AI models comprises:

a first neural network configured to partially denoise the vector representation of the noisy image during a first portion of the iterative denoising when a noise level of the vector representation exceeds a threshold; and a second neural network configured to partially denoise the vector representation of the noisy image during a second portion of the iterative denoising when the noise level of the vector representation is below the threshold.

8. A non-transitory, computer-readable storage medium storing instructions for dynamically generating augmented digital media representing embedded product data using artificial intelligence (AI) models, wherein the instructions when executed by at least one data processor of a system, cause the system to:

receive an output generation request from a user interface of a computing device to generate an augmented image using an input, the input identifying (1) a person image and (2) a product image;

generate, using a first set of AI models, a set of input descriptions comprising (1) a person image description defining a person from the person image and (2) a product image description defining a product from the product image;

construct a prompt of the output generation request by mapping, using a second set of AI models, (1) the person image description and (2) the product image into a vector space to generate (1) a person vector representation and (2) a product vector representation;

generate, using a third set of AI models, an initial augmented image indicating the person wearing the product from the product image by:

generating a vector representation of a noisy image by applying a noise value to the person vector representation, wherein the noise value is indicative of an unmodified portion of the initial augmented image, and iteratively denoising the vector representation of the noisy image in accordance with the constructed prompt to generate a vector representation of the initial augmented image, wherein the initial augmented image depicts the person from the person image with one or more pixels of the person image replaced by the product image; and apply a fourth set of AI models conditioned on the vector representation of the initial augmented image to generate a fine-tuned augmented image that modifies one or more pixels of the initial augmented image in accordance with at least one of: (1) a complexion of the person, (2) a face shape of the person, (3) a body shape of the person, (4) a pose of the person, or (5) a set of camera parameters of a camera capturing the person image; and cause display of, on the user interface of the computing device, graphical data representing the fine-tuned augmented image.

9. The non-transitory, computer-readable storage medium of claim 8, wherein the system is further caused to:

receive a user input to adjust at least one parameter used to generate the fine-tuned augmented image, wherein the at least one parameter includes at least one of: a guidance scale, a control guidance scale, a strength scale, a seed value, or a number of diffusion steps.

10. The non-transitory, computer-readable storage medium of claim 8, wherein causing display of the graphical data representing the fine-tuned augmented image further causes the system to:

progressively loading the graphical data by:

displaying a placeholder image, and replacing the placeholder image with a new image that has a greater degree of fidelity.

11. The non-transitory, computer-readable storage medium of claim 8, wherein the product image comprises a digital photograph of a specific retail item.

12. The non-transitory, computer-readable storage medium of claim 8, wherein the image is a frame within a plurality of frames that represent a video, and wherein the system is further caused to:

modify one or more other frames within the plurality of frames based on the fine-tuned augmented image.

13. The non-transitory, computer-readable storage medium of claim 8, wherein one or more of the first, second, third, or fourth set of AI models are the same.

14. The non-transitory, computer-readable storage medium of claim 8, wherein the system is further caused to:

remove a background of one or more of the person image or the product image.

15. A system comprising:

at least one hardware processor; and at least one non-transitory memory storing instructions, which, when executed by the at least one hardware processor, cause the system to:

receive an output generation request from a user interface of a computing device to generate an augmented image using an input, the input identifying (1) a person image and (2) a product image;

generate, using a first set of AI models, a set of input descriptions comprising (1) a person image description defining a person from the person image and (2) a product image description defining a product from the product image;

construct a prompt of the output generation request by mapping, using a second set of AI models, (1) the person image description and (2) the product image into a vector space to generate (1) a person vector representation and (2) a product vector representation;

generate, using a third set of AI models, an initial augmented image indicating the person wearing the product from the product image by:

generating a vector representation of a noisy image by applying a noise value to the person vector representation, wherein the noise value is indicative of an unmodified portion of the initial augmented image, and iteratively denoising the vector representation of the noisy image in accordance with the constructed prompt to generate a vector representation of the initial augmented image, wherein the initial augmented image depicts the person from the person image with one or more pixels of the person image replaced by the product image; and apply a fourth set of AI models conditioned on the vector representation of the initial augmented image to generate a fine-tuned augmented image that modifies one or more pixels of the initial augmented image in accordance with at least one of: (1) a complexion of the person, (2) a face shape of the person, (3) a body shape of the person, (4) a pose of the person, or (5) a set of camera parameters of a camera capturing the person image; and cause display of, on the user interface of the computing device, graphical data representing the fine-tuned augmented image.

16. The system of claim 15, wherein the system is further caused to:

resize one or more of the person image or the product image.

17. The system of claim 15, wherein the system is further caused to:

applying a Canny filter to the person image to generate a set of edges outlining the person in the person image.

18. The system of claim 15, wherein applying the fourth set of AI models further causes the system to:

use a conditional generative adversarial network (cGAN) trained on skin tone pairs to modify skin color of the initial augmented image.

19. The system of claim 15, wherein the system is further caused to:

extract, using a set of convolutional layers of the first set of AI models, a set of feature vectors from the person image and the product image; and generate, a set of natural language descriptions of the person image and the product image based on the extracted feature vectors, wherein the natural language descriptions indicate at least one of pose, body shape, facial features, color, or texture.

20. The system of claim 15, wherein the system is further caused to:

generate multiple candidate descriptions for the person image and the product image; and rank the candidate descriptions based on a set of predefined criteria.

* * * * *